United States Patent [19]
Smith et al.

[11] Patent Number: 5,420,993
[45] Date of Patent: May 30, 1995

[54] EXTENDED ADDRESS TRANSLATION SYSTEM FOR POINTER UPDATING IN PAGED MEMORY SYSTEMS

[75] Inventors: Christopher E. Smith, El Toro; Robert L. Noble, Lake Elsinore; Howard J. Keller, Carlsbad, all of Calif.

[73] Assignee: Unisys Corporation, Blue Bell, Pa.

[21] Appl. No.: 260,169

[22] Filed: Jun. 14, 1994

Related U.S. Application Data

[63] Continuation of Ser. No. 714,480, Jun. 13, 1991, abandoned.

[51] Int. Cl.$^6$ .............................................. G06F 12/10
[52] U.S. Cl. .................................................. 395/400
[58] Field of Search ................... 395/400, 425; 365/49

[56] References Cited

U.S. PATENT DOCUMENTS

| | | | |
|---|---|---|---|
| 4,669,043 | 5/1987 | Kaplinsky | 395/425 |
| 4,774,659 | 9/1988 | Smith et al. | 395/400 |
| 4,794,521 | 12/1988 | Ziegler et al. | 395/425 |
| 4,811,206 | 3/1989 | Johnson | 395/425 |
| 5,053,951 | 10/1991 | Nusinov et al. | 395/425 |
| 5,222,222 | 6/1993 | Mehrina et al. | 395/400 |
| 5,226,005 | 7/1993 | Lee et al. | 365/49 |

OTHER PUBLICATIONS

Hayes, John P. *Computer Architecture and Organization* McGraw-Hill, 1978, pp. 370–375.

Primary Examiner—Jack B. Harvey
Assistant Examiner—Jack A. Lane
Attorney, Agent, or Firm—Alfred W. Kozak; Mark T. Starr; Stanton D. Weinstein

[57] ABSTRACT

A system for updating logical address data in pointers used by a processor in a computer system using paged memory. An Actual Segment Descriptor Associative Memory System (ASDAM) provides a dual cache memory for searching page table logical addresses and page index values which can, if available, provide a logical address, via a logical address RAM, to update a pointer in one machine cycle, with a new logical address. If the required data is not available in the dual cache memory, then other circuitry is operative to translate logical addresses into physical addresses permitting rapid access to main memory in order to supply the dual cache memory and logical address RAM with the required data.

16 Claims, 12 Drawing Sheets

| ABSOLUTE ADDRESS OF TABLE PAGE | PAGE INDEX | ASD NUMBER |
|---|---|---|
| 5019 | 19 | 17 |
|  |  |  |
| 5006 | 6 | 30 |
| 5005 | 5 | 25 |
| 5004 | 4 | 40 |
| 5003 | 3 | 120 |
| 5002 | 2 | 90 |
| 5001 | 1 | 60 |
| 5000 | 0 | 20 |

FIG. 2.1

| ABSOLUTE ADDRESS | ASD WORD |
|---|---|
|  |  |
| 5 | ASD WORD 2 OF ASD NUMBER 1 |
| 4 | ASD WORD 1 OF ASD NUMBER 1 |
| 3 | ASD WORD 4 OF ASD NUMBER 0 |
| 2 | ASD WORD 3 OF ASD NUMBER 0 |
| 1 | ASD WORD 2 OF ASD NUMBER 0 |
| 0 | ASD WORD 1 OF ASD NUMBER 0 |

4 WORDS FOR EACH ASD NO.

| ASD # | WORD 1 OF ASD NUMBER INVOLVED | WORD 2 OF ASD NUMBER INVOLVED | WORD 3 OF ASD NUMBER INVOLVED | |
|---|---|---|---|---|
| | ASD 1 | ASD 2 | ASD 3 | ASD 4 |
| | BASE ADDR. OF SEGMENT | LENGTH OF SEGMENT | PAGE # | ASD # OF PAGE TABLE |
| 0 | | | | |
| 1 | | | | |
| 10 | 4000 | 200 | | |
| 30 | 2000 | 4096 | 6 | 15 |

FIG.2.3

| P | I | SIZE | VI | CI | ASD_NO |
|---|---|---|---|---|---|

INDEX FIELD = { VI, CI, ASD_NO }

FIG.2.4

| P | I | SIZE | VI | ASD_NO |
|---|---|---|---|---|

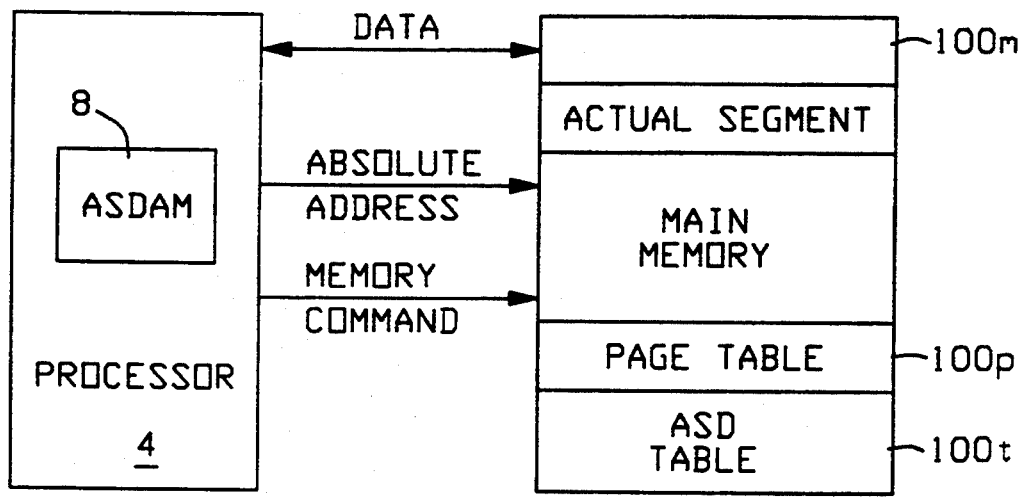
FIG. 3.1
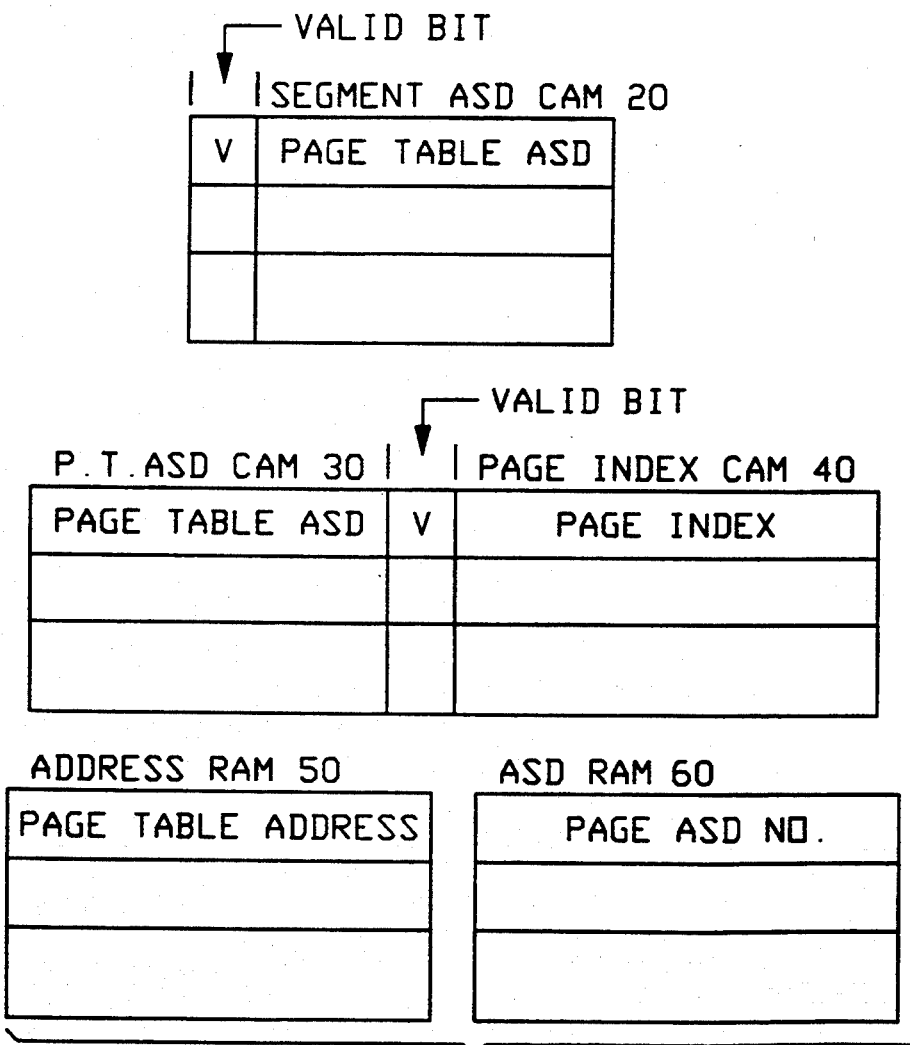
FIG. 3.2

SEGMENT ASD CAM

| | | |
|---|---|---|
| 0 | 1 | 50 (ASD#) |
| 1 | 1 | 35 (ASD#) |
| 2 → | 0 | (15) |
| 3 | 0 | |
| | | |

~20

LOCATION ↓

PAGE TABLE ASD CAM | PAGE INDEX CAM

| | PAGE TABLE ASD CAM | | PAGE INDEX CAM |
|---|---|---|---|
| 0 | 15 | 1 | 4 |
| 1 | 15 | 1 | 1 |
| 2 → | 35 | 1 | 7 |
| 3 | (15) | 0 | (0) |
| | | | |

30 ⌣          ⌣ 40

PHYSICAL ADDRESS RAM | ASD RAM 50 (ASD NO.)

| | PHYSICAL ADDRESS RAM | | ASD RAM 50 (ASD NO.) |
|---|---|---|---|
| 0 | 1000 | 0 | 40 |
| 1 | 2000 | 1 | 60 |
| 2 | (5000) | 2 | 38 |
| 3 | | 3 | (20) |
| | | | |

↑ LOCATION          ⌣ 50          ⌣ 60

FIG. 3.3

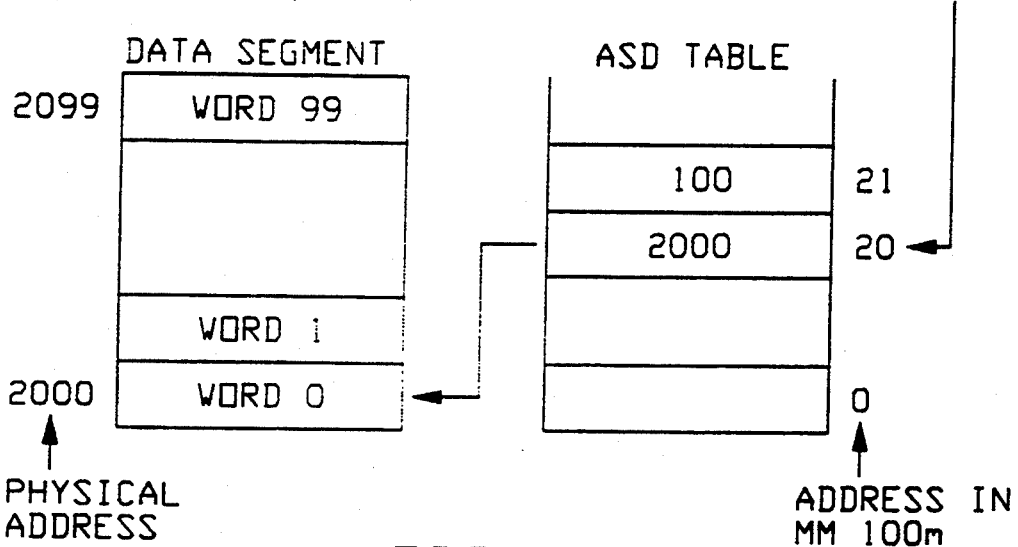
FIG.4.1.1
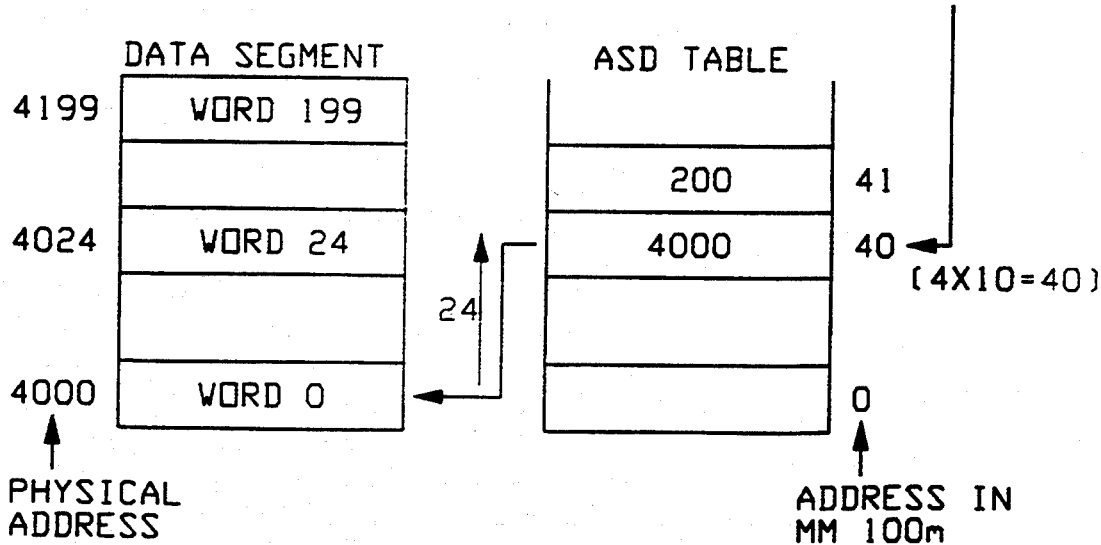
FIG.4.1.2

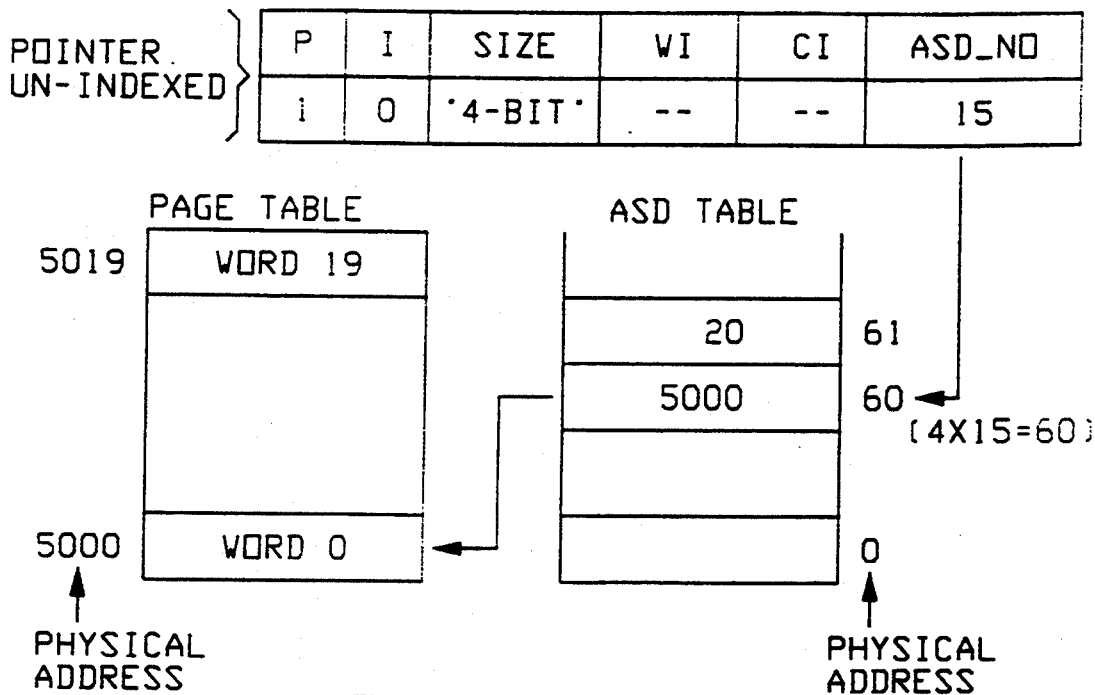
FIG.4.1.3
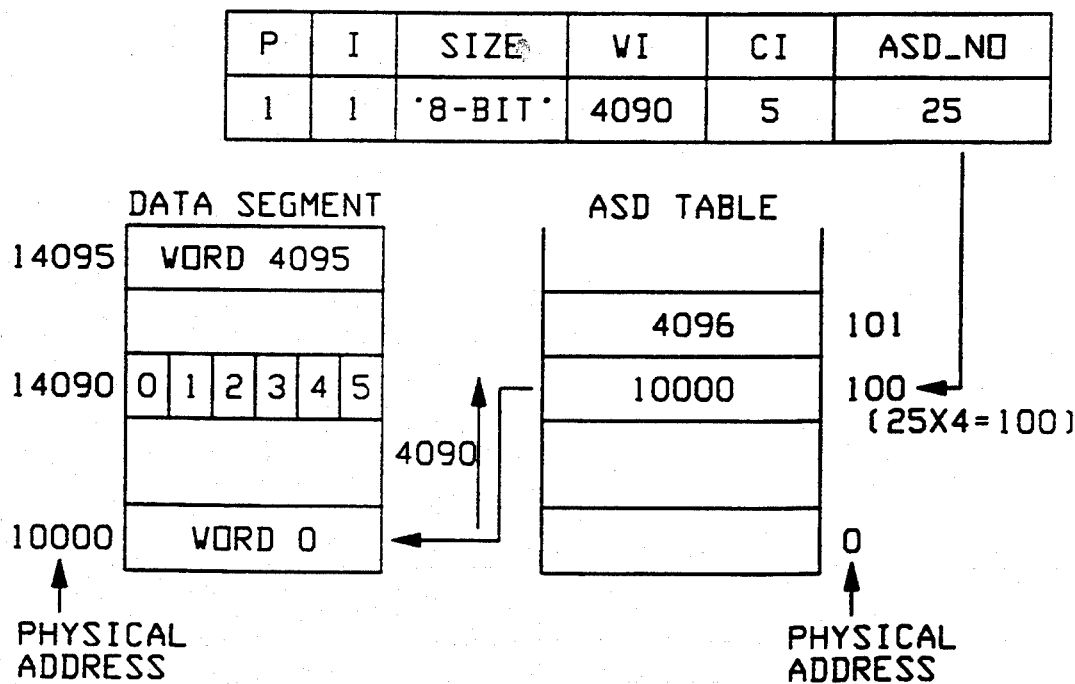
FIG.4.1.4

| INDEX VAULE | P | I | SIZE | VI | ASD_NO |
|---|---|---|---|---|---|
| 10,000 | 0 | | "WORD" | | |

FIG.4.2.1

| INDEX VAULE | P | I | SIZE | VI | ASD_NO |
|---|---|---|---|---|---|
| 10,000 | 1 | | "DOUBLE" | | |

FIG.4.2.2

| INDEX VAULE | P | I | SIZE | VI | CI | ASD_NO |
|---|---|---|---|---|---|---|
| 10,000 | 1 | | "4-BIT" | | | |

FIG.4.2.3

| INDEX VAULE | P | I | SIZE | VI | CI | ASD_NO |
|---|---|---|---|---|---|---|
| 10,000 | 0 | | "8-BIT" | | | |

FIG.4.2.4

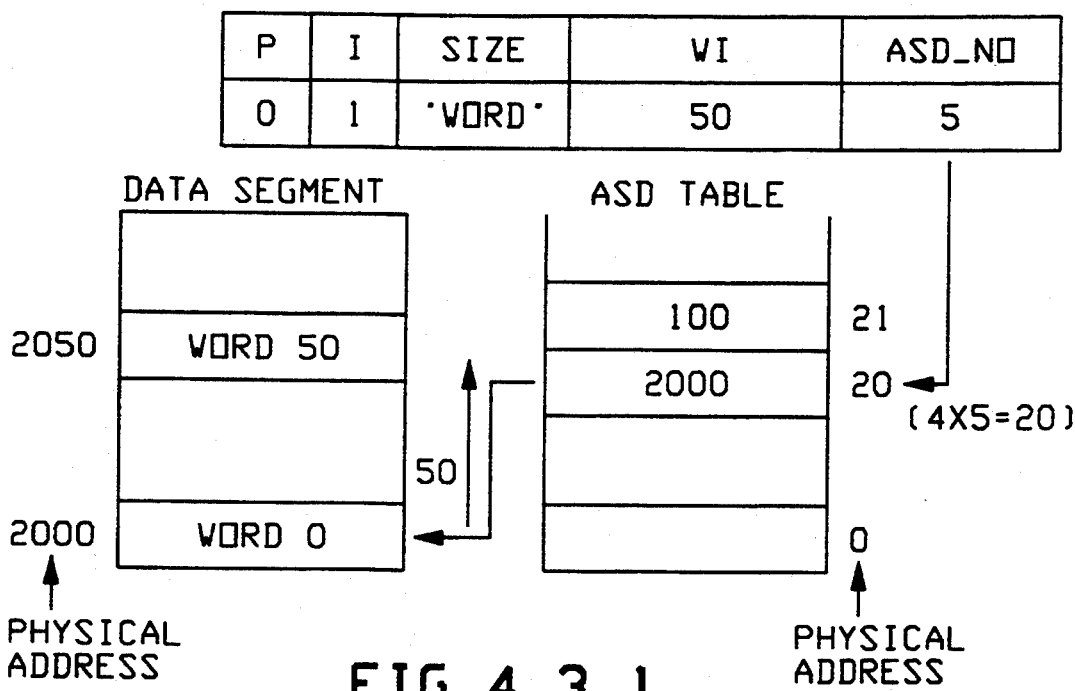
FIG.4.3.1
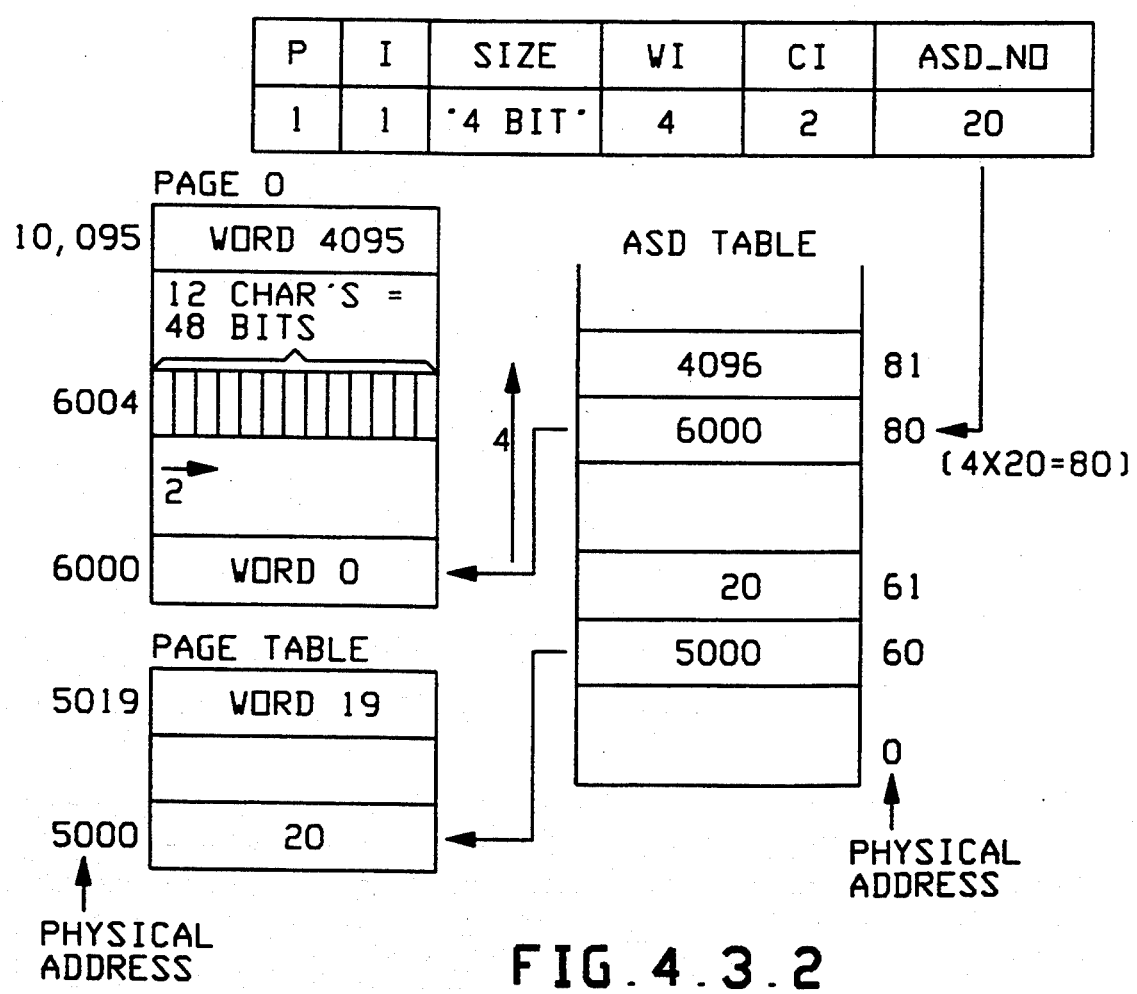
FIG.4.3.2

SEGMENT ASD CAM

| Location | | |
|---|---|---|
| 0 | 1 | 50 |
| 1 | 1 | 35 |
| 2 | 1 | 15 |
| 3 → | 0 | |
| 4 | 0 | |

20

PAGE TABLE ASD CAM / PAGE INDEX CAM

| Location | Page Table ASD | | Page Index |
|---|---|---|---|
| 0 | 15 | 1 | 4 |
| 1 | 15 | 1 | 1 |
| 2 | 35 | 1 | 7 |
| 3 | 15 | 1 | 0 |
| 4 → | | 0 | |

30                40

ADDRESS RAM

| Location | |
|---|---|
| 0 | 1000 |
| 1 | 2000 |
| 2 | 5000 |
| 3 | |
| 4 | |

50

ASD RAM

| Location | |
|---|---|
| 0 | 40 |
| 1 | 60 |
| 2 | 38 |
| 3 | 20 ← DESTINATION ASD NO. |
| 4 | |

SEGMENT ASD CAM

| | | |
|---|---|---|
| 0 | 1 | 50 |
| 1 | 1 | 35 |
| 2 | 1 | 15 |
| 3→ | 0 | |
| 4 | 0 | |
| 5 | 0 | |
| | | |

~20

PAGE TABLE ASD CAM | PAGE INDEX CAM

| | PAGE TABLE ASD CAM | | PAGE INDEX CAM |
|---|---|---|---|
| 0 | 15 | 1 | 4 |
| 1 | 15 | 1 | 1 |
| 2 | 35 | 1 | 7 |
| 3 | 15 | 1 | 0 |
| 4→ | 15 | 1 | 2 |
| 5 | | 0 | |

30 ~ ~40

ADDRESS RAM | ASD RAM

| | ADDRESS RAM | | ASD RAM | |
|---|---|---|---|---|
| 0 | 1000 | 0 | 40 | |
| 1 | 2000 | 1 | 60 | |
| 2 | 5000 | 2 | 38 | DESTINATION ASD NO. |
| 3 | | 3 | 20 | ← |
| 4 | | 4 | 90 | |
| 5 | | 5 | | |

| P | I | SIZE | VI | CI | ASD_NO |
|---|---|------|----|----|--------|
| 1 | 1 | '4-BIT' | 4 | 2 | 90 |

FIG.4.4.2b

| P | I | SIZE | VI | CI | ASD_NO |
|---|---|------|----|----|--------|
| 1 | 1 | '4-BIT' | 4 | 2 | 60 |

FIG.4.4.3

EXTENDED ADDRESS TRANSLATION SYSTEM FOR POINTER UPDATING IN PAGED MEMORY SYSTEMS

This is a continuation of application Ser. No. 07/714,480 filed on Jun. 13, 1991, now abandoned.

CROSS REFERENCES TO RELATED APPLICATIONS

This disclosure, in regard to the use of content addressable memories is related to a co-pending commonly owned patent application entitled "Data Caching and Address Translation System With Rapid Turnover Cycle" and also to a commonly owned U.S. Pat. No. 5,226,005 which teaches the Search-Read CAM operation in one clock cycle, filed Feb. 22, 1991 as Ser. No. 660,455, which was allowed on Aug. 5, 1993.

FIELD OF THE INVENTION

This disclosure relates to the area of computer technology which involves systems for updating pointers to memory used in a computer processor.

BACKGROUND OF THE INVENTION

Memory referencing in a computer system typically follows one of two paradigms: a physical address model or a virtual address model. The physical model is most direct and therefore fast. A limitation of the physical model is the requirement that programs be written to run within the bounds of the particular computer systems physical memory space and at specific locations within that physical memory space. The virtual model is much more flexible, but the time required to translate from virtual space to physical space at run time can contribute detrimentally to the general performance of the computer system.

The definition of physical memory is the implementation, in physical devices, of a storage medium such that storage locations are physically contiguous from "0", or the lowest address, to some upper bound that is limited by the nature of the storage medium. The storage medium may allow random access to the individual storage locations or sequentially to the individual storage locations depending upon the nature of the physical storage medium. A computer system memory storage medium is typically implemented as Dynamic Random Access Memory integrated circuits. The granularity of memory is also important to this situation. Granularity refers to the smallest physical number of memory bits that can be addressed by the computer system hardware. This is defined as a memory word and the width in bits is dictated by the physical architecture of the computer system. A memory word may consist of one or more bytes (eight bit groups) of data.

There are two general models of mapping program data and program code structures onto a physical memory space. These are the segmentation model and the paged model. An important definition is that of a "block". A block of memory is the amount of physical memory large enough to contain a segment, in the segmented model, or one page, in the paged model.

The segmentation model is the most space efficient since it reserves exactly the amount of physical space, in words, required to exactly store the program data or code structures. A big disadvantage to the segmentation model is the requirement to map the entire virtual segment into a block of contiguous physical space. Large program code and data structures tend to limit the number of different programs that can co-exist in physical memory due to virtual segment size requirements, and therefore limit the multi-processing capability of the computer system.

The paged model requires that physical memory be broken down into chunks of uniformly sized block of memory, called pages, each block containing the same amount of contiguous physical memory. The page size (block size) is usually fixed by the physical architecture of the computer system and is typically in power of 2 sized (i.e. a page may be a block of 256, 512, 1024, etc. words of contiguous physical memory). An advantage of the paged model is that it eliminates the requirement of maintaining an entire program data or code structure in physical memory; the individual pages that make up the program data or code structure may be located in any order anywhere in physical memory. The paged model allows for efficient multi-programming by allowing some of the pages of a program's code or data structure to be swapped out of physical memory and be replaced by pages from some other unrelated program. The paged memory model allows implementation of efficient virtual to physical address translation mechanisms if page size is a power of 2. A major disadvantage of the paged model is the waste of physical memory space that occurs when program code and data structures are smaller than the space required for a page.

The ideal implementation of a physical model would allow some combination of the segmented and paged models. This invention defines the embodiment of an efficient mechanism that implements a combined paged-segmented model. This invention allows the efficiency of smaller non-swappable blocks and the resulting performance improvements to multiprocessing, along with the conservation of memory space allowed by the segmented model.

The logical implementation of a virtual memory system that would be a user of the paged-segmented physical model will typically use a logical structure called a "Pointer" to provide the virtual address in the virtual address model. The pointer is an abstract device that allows a program to reside in virtual rather than physical memory space and therefore detached from the physical implementation. This allows for efficient multiprocessing since the only effect that physical memory size has on the computing environment is one of performance.

Translations of virtual addresses to physical addresses in a paged memory system are typically implemented in special mechanisms known in the art as Translation Lookaside Buffers (TLB). These can be implemented in special hardware structures to improve efficiency, but sometimes are implemented as "soft" code routines. The mechanism in this embodiment consists of a unique implementation of a content addressable memory (CAM) architecture for efficient translation of paged segments and un-paged segments in hardware. This implementation is essential to the hardware pointer update mechanism enabling a rapidly updated pointer.

GENERAL OVERVIEW

This invention utilizes a CAM arrangement, called the Actual Segment Descriptor Associative Memory (ASDAM) to implement the paged-segmented model. The pointer, that is the "virtual address", is a logical structure that contains an index value, called an "ASD number", (and a displacement that will be utilized to provide the final information required) to point to the first physical word in a physical block of memory. The "ASD number", from the pointer, is an index into a special structure (existing in physical memory) that is known as the Actual Segment Descriptor Table. An entry in this table is really a structure that consists of four words (a word in this embodiment contains six bytes of data).

The "ASD Number" is the means of identifying a block of contiguous physical memory. Every block of contiguous physical memory has a unique ASD Number, assigned by the operating system. The correspondence between the ASD Number and the physical location of the block is provided by a four word entry in the ASD Table. An ASD Number in this embodiment is 23 binary bits in length, limited by the allowable field width of the ASD Number field within the pointer. The displacement field, mentioned previously, consists of a 20 bit wide field that is also limited by the allowable field width of the Displacement field within the pointer. However, these field width restrictions are not inherent in the invention but are only an artifact of the processor architecture.

In this embodiment, the physical blocks of memory are called "Actual Segments". In this embodiment, an Actual Segment may refer to a block containing contiguous words of physical memory equal to one page size, (Paged Model) or to a block containing contiguous words of physical memory that may be less or more than one page size (Segmented Model). The blocks containing more than one page size of words are reserved for special cases and are not typical. This embodiment allows for a mixture of "pure" virtual segments along with "paged" virtual segments with the term "virtual segments" referring to the virtual addressing environment. A "pure" virtual segment acts as defined by the segmented model. This allows the efficiency of the pure segmented model for virtual segment sizes that would be smaller than a page size.

An example of a "pure" virtual segment would be a 100 word actual segment (assuming a page size of 4096 words). As will be shown, this pure virtual segment, which consists of one actual segment, can be located in physical memory by means of it's ASD Number from it's pointer utilizing the proper entries in the ASD Table.

For program data and code structures larger than a page size, a paged-segmented model is implemented. This means that a data or code virtual segment, represented in the paged-segmented model, actually consists of a modulo page-size-number of pages (actual segments) terminated by an actual segment of less than one page-size number of words. A paged-segmented example would be a data virtual segment consisting of a 9233 word virtual segment actually composed of two actual segment pages (assume 4096 word page size) and terminated with a 1041 word actual segment. Each of the two page-size actual segments, along with the 1041 word actual segment have a unique ASD Number and corresponding ASD Table entry. Because of this, neither the actual segments containing the two pages nor the termination actual segment containing the 1041 remaining words are required to be contiguous with one another. The implementation of the ASDAM mechanism and pointer updating mechanisms allow for efficient access to this memory structure.

The paged-segmented model is implemented in this embodiment via a hierarchical pointer structure. Just as each virtual segment is referenced by a virtual pointer, each page is also referenced by it's own virtual pointer. This results in an overall environment where a pure virtual segment is addressed by only a single virtual pointer, whereas a paged virtual segment, represented by the paged-segmented model, is a two level hierarchy of virtual pointers; the first level consisting of a single virtual pointer representing the overall virtual segment, and the second level consisting of virtual pointers representing the pages within that virtual segment. The collection of virtual pointers representing the pages of the virtual segment are contained in an actual segment known as the "Page Table". The virtual pointers contained in the Page Table each contain an ASD Number that references a unique ASD Table entry representing each page. The Page Table actual segment is referenced via an entry in the ASD Table similar to any other actual segment. In this embodiment the first level pointer, representing the virtual segment, contains an ASD Number that references the Page Table via the ASD Table while the displacement field within the first level pointer indirectly references the desired physical word. The pointer hardware mechanism of this embodiment efficiently allows the transformation from a virtual segment address via two levels of virtual pointers to the final physical address required at run time.

The pointer hardware system, embodied herein, also allows for the rapid updating of the pointer automatically, while simultaneously taking into account page locations which are "non-contiguous", to provide a virtual address denoting any area of main memory.

The length of a page in this system embodiment is 4,096 data words. A Page Table is an Actual Segment of main memory which contains the ASD numbers (logical addresses) of the various pages which comprise a given Paged Segment. The ASD number of the first page is at the first location, the ASD number of the second page is at the second location and so on. The ASD Table ($100_t$) is stored in the main memory ($100_m$), FIG. 1.

The "base" of the ASD Table ($100_t$) is always at physical memory address "0". There are four words of data associated with each ASD number, containing the information describing the segment.

The data associated with ASD number 0 is stored at the memory addresses 0 thru 3. For ASD number 1, the data is stored at locations 4 thru 7. For ASD number 2, the data is stored at locations 8 thru 11, and so on for all of the ASD numbers. This is illustrated in FIGS. 2.2a and 2.2b.

The Absolute Address of the base of the Actual Segment is stored in the first of the four words which is designated ASD1. The "length" of the actual segment is stored in the second word, ASD2.

If the ASD number indicates a Page Actual Segment which is part of a Virtual Segment, then the third word in the table, ASD3, contains the ASD number of the Page Table and the page number of that page.

The final word, ASD4, is reserved for software use and is not described in the function of the current system.

Thus in order to translate a ASD number into a physical address of its ASD1 word of FIG. 2.2a, it is necessary to multiply the ASD number by 4. Similarly, in order to form the address of a word such as ASD2 or word ASD3, it is necessary to multiply by 4 and add 1 and also to multiply by 4 and add 2, respectively.

The purpose of the ASD System is to allow "logical addressing", whereby programs referencing data can be written and compiled without knowledge of the absolute physical address of the data in main memory. It is kept track of by the operating system. The ASD System of memory management allows data to be referenced throughout a region of memory much larger then that addressable using a 23-bit base address plus 20-bit displacement. This is done by using the ASD Table to map the ASD Number to a 32-bit base address.

For example, if the pointer contained the Absolute Address (23 bits), then since $2^{23} = 8$ million, it could address only 8 million locations. But with an ASD Number (23 bits) in the pointer referring to Base Address (32 bits) in the ASD Table it is now possible to address 4 billion locations ($2^{32} = 4$ billion).

The main memory is composed of 48-bit words and these are grouped into Actual Segments, or contiguous regions. Each of these regions is given an ASD Number. The ASD Table stores, for each ASD Number, the absolute address of the beginning (base) of the Actual Segment and its length. If the Actual Segment is one of the pages of the "Virtual Segment", then the ASD Number of its page table and the number of the page is also stored in the ASD Table. As stated, the length of the page is 4096 data words. A Page Table is an Actual Segment of memory which contains the ASD Numbers (logical addresses) of the various pages which comprise a given page segment. The ASD number of the first page is at the first location, the ASD number of the second page is at the second location, etc. Every Virtual Segment has its own Page Table and it resides in memory. An example of a Page Table is shown in FIG. 2.1.

Since the 4 words of data, called the ASD Words, are associated with each ASD Number, these words provide information about the segment. The ASD Table stores the ASD Words for every Actual Segment currently in use by the processor. It resides at a fixed location, which has a physical address of "0". The ASD words associated with ASD number "0" are stored at memory addresses 0 thru 3. For ASD number 1, they are stored at locations 4 thru 7, and so on for all ASD numbers.

The physical address of the base of the Actual Segment is stored in the first word, called ASD1. The length of the Actual Segment is stored in the second word, ASD2.

If the ASD number indicates an Actual Segment which is part of a Virtual Segment, then the third word of the Table, ASD3, contains the ASD number of the Page Table and the Page Number of that page. The final word, ASD4, is reserved for software use and has no function in the currently described system.

Normally, pointers begin in the state of being "unindexed" in which form they point to an entire region (segment) of memory. However, once the program "indexes" the pointer, it then points to a specific "element" in the memory and can be used to reference that element either for a Readout Function or for a Write-In Function.

An "element" is the unit of data of which a memory data segment is made. The element type or "size" of the memory data segment may be a single precision data word (48 binary bits) or a double precision data word (96 bits) or else it may be designated for "characters" which may be either 4 bits or 8 bits in length.

The "character" elements are not written to or read from memory individually but rather are grouped into 48 bit words. Thus a character is accessed by first reading from memory the entire in which it resides, and then subsequently extracting it from the word within the processor.

The pointer contains information as to the type of the elements in the segment at which it points in addition to stating whether the segment is paged or not. The structure of word and character pointers is shown in FIGS. 2.3 and 2.4.

Thus as seen in FIG. 2.3, the format of the pointer is delineated wherein a "1" in the paged bit block P indicates that the data segment is paged. A binary "1" in the I block indicates that the pointer has been indexed. The size block field would indicate a "0" for a single precision data word or if "1" would indicate a double precision data word. The size block indicates a 4-bit character data element when the value is "2" and indicates an 8-bit character data element when the value is "4". An indexed pointer also contains an Index Field. This consists of a Word Index if the size is "0" or "1"; or a character index and word index if the size is "2" or "4". The final block area of the pointer involves the ASD number which is the Actual Segment Descriptor number which indicates a particular actual segment in main memory. This segment may be a Page Table, a Page or another contiguous region of memory.

Thus the pointer of FIGS. 2.3 and 2.4 contain an ASD number which indicates to which actual segment of main memory that it is pointing. An indexed pointer (indexed bit I=1) also contains a "word index" which is a displacement from the base of the segment of the word at which it points.

If the pointer is a "character" pointer, that is, it points to character data, then it also contains a "character index" (CI) which indicates which particular character within the word is being designated and identified. The combination of the Word Index and the Character Index together are called the Index Field.

A pointer contains information as to whether the "Actual Segment" (of main memory) to which it points is one page of a "virtual" segment.

An "Unpaged Pointer", that is, a pointer which points to an unpaged segment, always contains the ASD number of that particular segment.

A "Paged Pointer", that is, one that points to a paged segment, if it is unindexed, contains the ASD number of the Virtual Segment's Page Table.

If a Paged Pointer is "indexed", then it contains the ASD number of the particular page at which it points. The action of indexing a pointer by an Index Value (FIG. 1) involves replacing the ASD number (if paged) and storing into the Index Field of the pointer, (FIG. 2.3) the "scaled" Index Value.

The Index Value is provided by processor 4 in terms of the number of data elements by which the pointer should be indexed. The data elements may be single words, double words, or characters. Characters are either 4 or 8 bits in size and these are stored in groups of 12 characters, or 6 charcters, per memory word respectively, since memory is addressable only by whole 48-bit words. The number of elements must be "scaled" into the number of words and characters or, if the segment is "paged" scaled into, pages, words, and characters that the specified number of elements occupies. These are referred to as the Page Index, Word Index and Character Index.

"Scaling" is achieved by multiplying by 2 for "double precision" words, or by leaving the number unchanged for "single precision" words, or by dividing by 12 for 4-bit characters. Or by dividing by 6 for 8-bit characters.

The "Index Value" is provided in terms of the number of data elements by which the pointer should be indexed. These data elements may involve single words, double words, or individual characters. The characters are either 4 bits or 8 bits in size and these are stored as 12 characters per memory word (4 bit character) or stored as 6 characters per memory word (8 bit characters).

Since the memory is addressable only by accessing the entire word, the number of elements involved must be "scaled" into a number of words and characters, or if the segment is paged, then it must be scaled into pages, words and characters.

These index values are referred to the (i) Page Index; (ii) Word Index, and (iii) Character Index.

A CAM is a memory structure whose function is to indicate which of the various internal data locations contains a data word presented to it as a "Searchkey". A data word is initially written into the CAM at a location indicated by an address input. Thereafter if the exact same data appears as input on the searchkey lines, (which indicates a match) this results in a "hit flag" being asserted and also a "location number", LN, (of the data location containing the search key data) which is provided as an output. This disclosed in commonly owned U.S. Pat. No. 5,226,005.

This location number "LN" output of a CAM may be used as an address input to a Random Access Memory (RAM). The RAM then provides, as an output, the actual data residing at that location in the RAM which corresponds to the location number of the original match of searchkey data in the CAM. Such a workable CAM array is described in the commonly owned U.S. Pat. No. 5,226,005 entitled "Dual Ported Content Addressable Memory Cell and Array" where the Search-Match and the "hit" output Location Number is effectuated in one clock cycle. Such a combination of CAM and RAM, for translating logical addresses to physical addresses, is called a "TLB" or Translation Lookaside Buffer.

In conventional systems, without the use of the newly described ASDAM system herein, typically pointers are updated by a combination of hardware and microcode. In conventional systems, a Translation Look-side Buffer (TLB) is used for the formation of physical addresses from logical addresses.

In the conventional system, the ASD Number is stored in Main Memory in an ASD Table contained in the Translation Lookaside Buffer, TLB.

In order to form a "physical address" from a segment pointing device, the ASD number from the pointer, is supplied to the TLB, which, if there is a "hit", supplies the address (on line $50_a$ FIG. 1) of the base of the segment being referred to.

The required "displacement" is then added to this base to form the address of the word located in main memory. The TLB (CAM 20 and RAM 50, FIG. 1) eliminates the need to read the base address from the ASD Table in memory (after the first time of use) and speeds up referencing of data from frequently used memory segments.

Since Page Tables are Actual Segments in memory, the ASD numbers in the Page Table (see FIG. 2.1) may also be stored in the TLB with the physical address of the base (starting address) of the Page Table stored in the RAM. Even with use of the Translation Lookaside Buffer (TLB), the updating of pointers into virtual segments can be a slow process.

In conventional systems, the processes of updating pointers are accomplished as follows:

(A) Indexing of Segment Pointers: the Index Value is scaled into a Word Index and Character Index and is then inserted directly into the Index Field (FIG. 2.3) of the pointer. The ASD number in the pointer is that of the Unpaged Segment and is not changed. The Indexed Bit I is set (=1).

(B) Indexing of Paged Pointers: the ASD number of the Page Table is extracted from the unindexed pointer and is used to search the TLB CAM. If there is a "hit" the physical address of the base of the Page Table is provided. If there is a "miss" in the TLB, then the ASD number is converted into the physical address of the location in main memory containing the base address and then a memory fetch is initiated.

Once the base address of the Page Table is available, it is "added" to the Page Index of the Scaled Index Value to form the address of the location in the Page Table which contains the ASD number of the particular page at which the pointer will point.

The data at this address is then fetched from memory. This ASD number, when it returns, is inserted into the pointer together with the Word and Character Indices given by the scaling of the Index Value. This process takes several machine cycles plus one or two memory accesses.

It is the above situation B (Indexing of Paged Pointers) that the ASDAM system is designed to expedite operations. Without it, paged indexing operations are slow and inefficient. Many machine cycles are consumed and much extra microcode control is required. Additionally, the volume of memory traffic is substantially increased.

GLOSSARY OF TERMS

ACTUAL SEGMENT: A contiguous region of main memory.

ACTUAL SEGMENT DESCRIPTOR (ASD): A set of 4 words used to describe an ACTUAL SEGMENT. The ASD contains the BASE address and the LENGTH of the segment. If it is one PAGE of a VIRTUAL SEGMENT, then it also contains its PAGE INDEX and the ASD NUMBER of the PAGE TABLE.

ACTUAL SEGMENT DESCRIPTOR ASSOCIATIVE MEMORY (ASDAM): A local cache system for performing ADDRESS TRANSLATION in a computer system using the ASD system of main memory management.

ADDRESS RAM: One of the 3 RAMs used by the ASDAM system, this 32-bit wide by 16-word deep RAM contains the PHYSICAL ADDRESSES of PAGE TABLES for use in ADDRESS TRANSLATION.

ADDRESS TRANSLATION: The process by which LOGICAL ADDRESSES are turned into PHYSICAL ADDRESSES.

ASD NUMBER: A number used to identify ACTUAL SEGMENTS of main memory and to associate them with their ASD words.

ASD RAM: A table in main memory maintained by the computer operating system to associate ASD NUMBERS with their ASD words. It always begins at PHYSICAL ADDRESS 0.

ASD TABLE: A table in main memory maintained by the computer operating system to associate ASD NUMBERS with their ASD words. It always begins at PHYSICAL ADDRESS 0.

BASE: The PHYSICAL ADDRESS of the first word of an ACTUAL SEGMENT in main memory.

CAM (CONTENT ADDRESSABLE MEMORY): A memory structure which is used to compare a data item with the set of data items already stored within itself. A match results in a HIT FLAG and LOCATION NUMBER being provided.

CHARACTER INDEX: A number used in identifying a particular character position within a 48-bit data word. It may take the range 0 to 5 for 8-bit data and 0 to 11 for 4-bit data. It is stored within the POINTER as part of the INDEX FIELD.

CONTROL LOGIC: A part of the ASDAM system providing overall control to the memories and associated logic blocks. The control logic is responsible for interpreting the various requirements of the operator being executed and initiating the actions necessary for the ASDAM to complete it.

DESTINATION PAGE INDEX: The number identifying which page of a VIRTUAL SEGMENT a pointer will reference after an INDEX operation has been performed.

HIT FLAG: An output from a CAM indicating whether a match on the searchkey data has been found.

INDEX BIT: A 1-bit field within a POINTER which indicates whether the pointer has been indexed or not.

INDEX FIELD: A region within an INDEXED POINTER indicating the displacement from the base of the ACTUAL SEGMENT of the data word referenced by the POINTER. It has no significance in the case of an UNINDEXED POINTER.

INDEX VALUE: A number of data elements supplied by the processor to the ASDAM. It indicates by how many data elements the pointer should be incremented during the INDEXING operation.

INDEED POINTER: A pointer which has been previously indexed i.e. one with the INDEX BIT set. Such a pointer indicates a single data element in main memory.

INDEXING: The action of updating an UNINDEXED POINTER by applying an INDEX VALUE. The result of an INDEXED POINTER referencing a data element corresponding to that INDEX VALUE.

LENGTH: The number of data words in an ACTUAL SEGMENT in main memory.

LOCATION NUMBER: An output from a CAM indicating, when a match on the searchkey data has been found, which location contains the matching data.

LOGICAL ADDRESS: A reference to a word in main memory, with an offset relative to the BASE of an ACTUAL SEGMENT and an ASD NUMBER indicating that SEGMENT via the ASD TABLE.

MEMORY ADDRESS: The identifier of a location in main memory.

MEMORY COMMAND: An instruction issued by the processor to main memory requesting either a read operation from the accompanying address or a write operation using the accompanying address and data.

MEMORY REQUEST LOGIC: A part of the ASDAM system which, upon direction from the CONTROL LOGIC, forms PHYSICAL ADDRESSES and issues MEMORY COMMANDS to the main memory.

ORIGINAL INDEX FIELD: The INDEX FIELD contained within the POINTER before the RE-INDEXING operation is performed.

ORIGINAL PAGE INDEX: The PAGE INDEX contained within the POINTER before the RE-INDEXING operation is performed.

ORIGINAL POINTER: The POINTER before the INDEXING or RE-INDEXING operation is performed.

PAGE: An ACTUAL SEGMENT of fixed size i.e. 4096 words in the system described.

PAGE CROSSING FLAG: A signal, generated by the UPDATE INDEX LOGIC, indicating that the INDEXING operation being performed has resulted in the DESTINATION POINTER referencing a data word in a different PAGE of a VIRTUAL SEGMENT from the ORIGINAL POINTER.

PAGE INDEX: The identifying number of a particular PAGE within a VIRTUAL SEGMENT.

PAGE INDEX CAM: One of the 3 CAMs of the ASDAM system, this 12-bit wide by 8-word deep CAM is used to store the PAGE INDICES of PAGES whose ASD NUMBERS are stored in the ASD RAM.

PAGE TABLE: An ACTUAL SEGMENT associated with a VIRTUAL SEGMENT and containing the ASD NUMBERS of each of the PAGES of the segment.

PAGE TABLE ASD CAM: One of the 3 CAMs of the ASDAM system, this 23-bit wide by 8-word deep CAM is used to store the ASD NUMBERS of various PAGES and PAGE TABLES for use by the ASDAM in updating POINTERS.

PAGE INDEX RAM: One of the 3 RAMs of the ASDAM system, this 12-bit wide by 8-word deep RAM stores the PAGE INDICES of various PAGES used for ADDRESS TRANSLATION.

PAGED BIT: A 1-bit field within a POINTER which indicates whether the regions of main memory referenced by the POINTER is paged or not.

PAGED MEMORY: A method of organizing main memory such that data is divided into PAGES, i.e. SEGMENTS of fixed size, for easier management.

PAGED POINTER: A POINTER indicating a region of PAGED MEMORY.

PHYSICAL ADDRESS: The identifier of location in main memory expressed as the number of that location relative to the absolute base of main memory.

POINTER: A data structure used to locate a SEGMENT of main memory or a particular word within a SEGMENT.

RAM (RANDOM ACCESS MEMORY): A hardware memory structure within which data words may be stored and subsequently retrieved.

RE-INDEXING: The action of updating an INDEXED POINTER by applying an INDEX VALUE. The result is an INDEXED POINTER referencing a data element corresponding to the sum of that INDEX VALUE and the ORIGINAL INDEX FIELD.

SEGMENT: A region of main memory. It may be contiguous or paged.

SEGMENT ASD CAM: One of the 3 CAMs of the ASDAM system, this 23-bit wide by 16-word deep CAM is used to store the ASD NUMBER of various PAGE TABLES used in the ADDRESS TRANSLATION process.

SIZE FIELD: A field within a POINTER indicating the type of data element which is stored in the SEGMENT referenced by the POINTER. Possible values are single precision words, double precision words, 4-bit characters and 8-bit characters.

TRANSLATION LOOKASIDE BUFFER (TLB): A combination of a CAM and a RAM whereby the ADDRESS TRANSLATION process can be achieved without accessing data in main memory.

UNINDEXED POINTER: A POINTER which references an entire region of main memory, rather than a single data element. This is the initial form of POINTERS before indexing and is identified by the INDEX BIT being set equal to zero.

UNPAGED POINTER: A POINTER which references a single contiguous region of main memory, rather than a VIRTUAL SEGMENT. This is identified by the PAGED BIT being set equal to zero.

UPDATE INDEX LOGIC: A region of main memory which is divided into a number of PAGES for easier management.

WORD INDEX: The number of the word referenced by an INDEXED POINTER relative to the base of the ACTUAL SEGMENT. It is stored within the POINTER as part of the INDEX FIELD.

SUMMARY OF THE INVENTION

When an instruction currently being executed by a processor indicates that a pointer needs to be updated, the pointer and the Index Value from processor 4 are provided to the ASDAM system. (FIG. 1). The Control Logic 100 determines whether the pointer references character data, in which situation a single machine cycle hold of the processor is invoked.

The incoming Index Value is appropriately scaled according to the size field in order to give a Page, Word and Character Index. Special purpose hardware is used for character pointers to divide the Index Value. This is dynamically invoked by the scaling logic, 10.

The Control Logic 100 locates the ASD Number from the pointer and this is applied to both the Segment ASD CAM 20 and the Page Table ASD CAM 30. The respective hit flags indicate whether this ASD number is present. Simultaneously, the Page Index (FIG. 2.1) of the scaled Index Value is applied to the Page Index CAM 40. The hit flag indicates whether this Page Index is present.

The control logic 100 determines whether the pointer is paged or unpaged and which of the 3 CAMs 20, 30, 40 scored "hits" in their searches. Based on this information, the control logic is able to determine what information is required for the particular update and whether it is present in the ASDAM. Memory requests are initiated to fetch any missing data. The searchkey data, which scored the "miss" and caused the memory fetch is stored in a location of that CAM. When the data returns, it is stored in the corresponding location of the appropriate RAM. Then when all the data is present, the pointer update is completed.

The indexing of "unpaged" pointers, previously mentioned, is accomplished in a single machine cycle, unless the pointer indicates character data, in which case the scaling takes an extra cycle. Since the ASD number in the pointer does not change, the CAMs and the RAMs are not required and their hit flags and outputs are ignored.

The indexing of pointers to "paged" segments of word data can be accomplished in a single machine cycle, using the ASDAM system. The ASD number contained in the pointer initially, is that of the Page Table for the Virtual Segment. (Page Table shown in FIG. 2.1).

The Page Index and the ASD number are used to search the Page Table ASD CAM 30 and the Page Index CAM 40 respectively. If both (Page Index and ASD number) are present, then the data in the corresponding location of the ASD RAM 60 is the ASD number of the "destination page". This ASD number is inserted into the pointer along with the scaled Word Index and Character Index, if any, and the index operation is completed.

If there is a not a "hit" in the same location of both the Page Table ASD CAM 30 and the Page Index CAM 40, then the required data is not present in the ASD RAM 60 and must be fetched from main memory $100_m$ (FIG. 1). If there is a "hit" found in the simultaneous search for this Page Table ASD number in the Segment ASD CAM 20, then the corresponding location in the Address RAM 50 will contain the physical address of the base of the Page Table of this Virtual Segment. In this case the Page Index is added to the Page Table base address to form the address of the location in the Page Table which contains the ASD number of the destination page.

A Read request to memory is issued to fetch this data which is stored on its return in the ASD RAM 60 while its corresponding Page Table ASD number and Page Index are stored in the Page Table ASD CAM 30 and Page Index CAM 40. The pointer update is then restarted and this time the Page Table ASD CAM 30 and the Page Index CAM 40 both yield "hits" and the operation is completed.

If there are no hits at the same location in both the Page Table ASD CAM 30 and the Page Index 40 and there is no hit in the Segment ASD CAM 20, then the base address of the Page Table must be fetched from main memory $100_m$. The ASD number of the Page Table is translated into the physical address of its ASD1 Word containing the address of the base of the Page Table. A memory Read is initiated to return this ASD1 Word and it is stored in a location in the Address RAM 50. The Page Table ASD number is stored in the Segment ASD CAM 20 at the corresponding location. Thus when the pointer update is restarted, the Segment ASD CAM 20 shows a "hit" while the hit-flags from the other 2 CAMs 30 and 40 remain unchanged. The operation continues as described above with the ASD number of the destination page being fetched and stored in the ASD RAM 60. When the pointer update is restarted for the second time, it will complete without further delay.

During execution, programs typically reference a small number of data segments many times and each page of a Virtual Segment is accessed many times. The updating of pointers therefore requires the same ASD numbers to be fetched from memory many times. The ASDAM (Actual Segment Descriptor Associative Memory) is a small cache located within the processor for providing these ASD numbers. Hit rates of over 90% are regularly achieved thus having a significant effect on the overall processor performance.

Special purpose hardware is also provided to scale the Index Value and to form memory addresses to reference missing data. The hardware also extracts the ASD number from the original pointer and merges the destination ASD number and the Word and Character Indices back into the pointer. These hardware functions save the machine cycles and the microcode that would be required to perform the same functions using the ordinary general purpose processing hardware.

Thus the Actual Segment Descriptor Associative Memory (ASDAM) system is a hardware system for updating pointers. Short microcode routines are dynamically invoked to load the CAMs and the RAMs when missing data is detected. This allows the primary microcode to be optimized with the assumption that all data will be present locally in the processor and the update will occur in a single machine cycle. The hardware takes all the necessary action to fetch the missing data and restart the operation. The ASDAM system also allows primary microcode to treat all pointers the same, whether they are paged or unpaged. The ASDAM hardware distinguishes dynamically and indexes the pointers correctly.

By reducing all pointers to a single category, the microcode requirement is further reduced. A further strength of this ASDAM system is that, despite its high "hit" rate, it is able to anticipate "misses" by simultaneously performing searches and generating addresses to be used in the event that all data is not present.

Thus, if a "miss" is detected, the Control Logic 100 can dynamically initiate a fetch request to memory without wasting a single machine cycle. If the data is present, the update is completed and the fetch request and its address are discarded.

Given CAM hits, the ASDAM system can perform back-to-back paged pointer updates at the rate of 1 per machine cycle indefinitely. This would compare to about the requirement of 15 machine cycles without the use of the ASDAM system.

Further, in the processor used with the ASDAM system, the microcode is entirely contained within VLSI silicon dies. The microcode memory space is therefore at a premium and the savings achieved by using the ASDAM system increases performance by making space for additional optimization in other routines as well as the direct savings in updating pointers.

BRIEF DESCRIPTION OF THE DRAWINGS

FIG. 2.1 shows an example of a Page Table for a Virtual Segment;

FIG. 2.2a shows an example of the ASD (Actual Segment Descriptor) Table, which resides in main memory;

FIG. 2.2b is a symbolic representation of the ASD Table showing the address of each item and how it associates its information with the ASD number and where the segment length is in the number of words involved in the segment;

FIG. 2.3 shows the structure of a character pointer;
FIG. 2.4 shows the structure of a Word Pointer;
FIG. 3.1 shows the ASDAM located within the processor and its relationship to the main memory;

FIG. 3.2 shows the CAM and RAM memory structures in the ASDAM;
FIG. 3.3 illustrates the contents of the ASDAM CAMs and RAMs.

FIG. 4.1.1 show an example of a relationship between the unindexed pointer, the ASD Table and a data segment;

FIG. 4.1.2 is an illustration of an indexed pointer in relation to the ASD Table and Data Segment;

FIG. 4.1.3 an example of an unindexed pointer describing an area of paged memory containing 4-bit character data;

FIG. 4.1.4 illustrates the use of an index pointer describing an area of paged memory containing an 8-bit character data;

FIG. 4.2.1 illustrates an Index Value and an unpaged word pointer;

FIG. 4.2.2 illustrates an Index Value and a paged word pointer;

FIG. 4.2.3 illustrates an Index Value and a paged character pointer;

FIG. 4.2.4 illustrates an Index Value and an unpaged character pointer;

FIG. 4.3.1 illustrates the relationship between pointers, data segments and the ASD Table after indexing;

FIG. 4.3.2 illustrates the relationship between paged pointers, data segments, the ASD Table and the Page Table after indexing;

FIG. 4.4.1 illustrates the contents of the ASDAM after completion of the indexing of a paged pointer;

FIG. 4.4.2a illustrates the contents of the ASDAM after the indexing of paged pointers;

FIG. 4.4.2b illustrates the updated pointer after the indexing of a paged pointer;

FIG. 4.4.3 is an illustration of an updated pointer after the indexing of a paged pointer;

Thus FIGS. 4.1.1 thru 4.1.4 show how blocks of memory and words within them are referenced by pointers; FIGS. 4.2.1 thru 4.2.4 show how various pointers and Index Values are used for purposes of pointer updating; FIGS. 4.3.1 and 4.3.2 show the relationships between pointers, data segments and the ASD Table as used in the examples of pointer updating; FIGS. 4.4.1 thru 4.4.3 show the updated pointer and the contents of the ASDAM CAMs and RAMs as used in the examples of pointer updating.

DESCRIPTION OF PREFERRED EMBODIMENT

Figure 1:
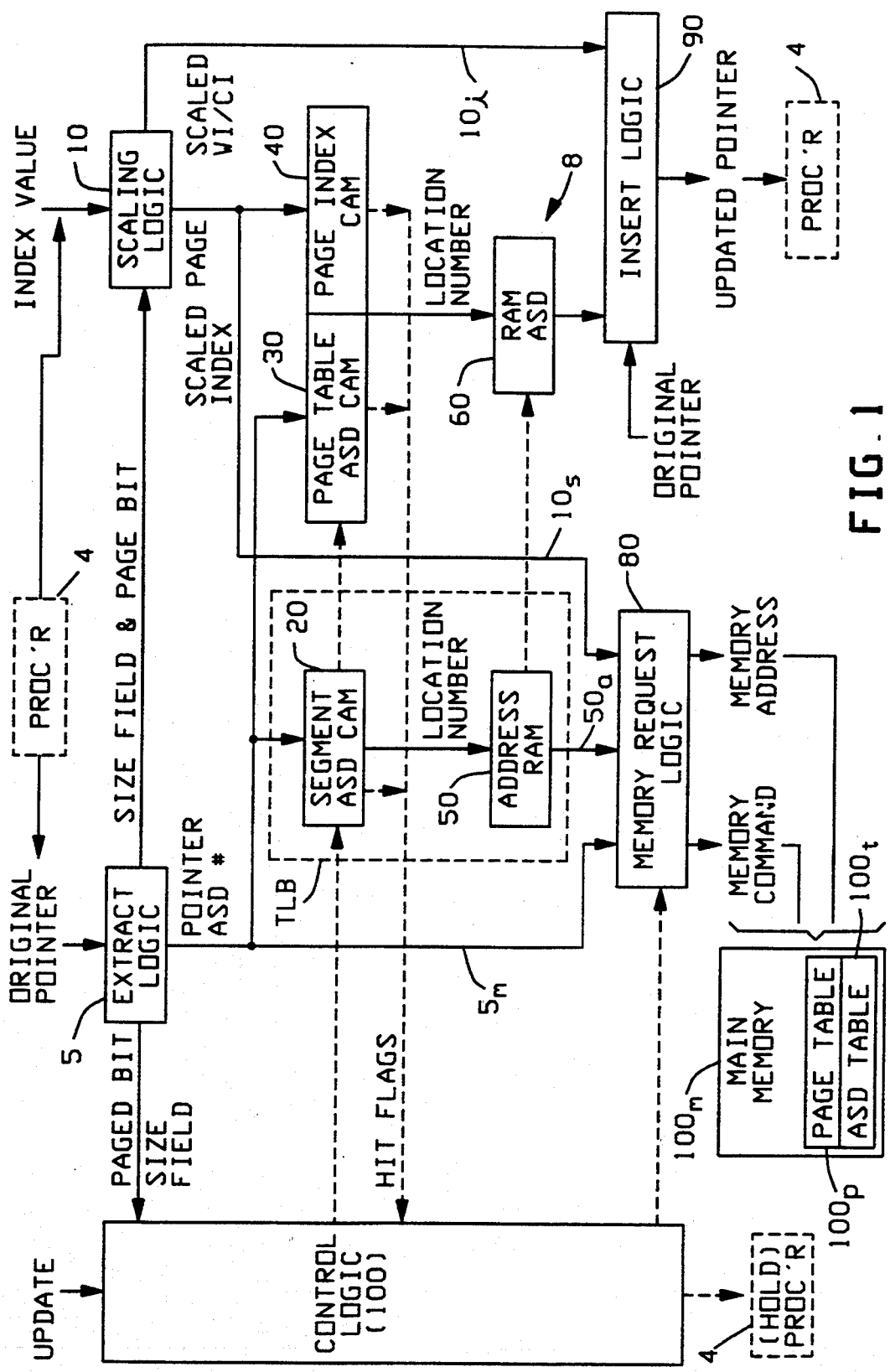
FIG. 1 is a block diagram of the overall structure of the actual Segment Descriptor Associative Memory System.

Referring to FIG. 1 there is seen a block diagram of the architecture of the Actual Segment Descriptor Associated Memory (ASDAM) system. As seen in FIG. 1 and more specifically in FIG. 3.2, the memory structures include three Content Addressable Memories (CAMs) and two Random Access Memories (RAMs).

Thus, in FIG. 1, the Actual Segment Descriptor CAM 20 receives an input of 23 bits from the extract logic unit 5, as does the Page Table ASD CAM 30. The scaling logic 10 outputs the scaled paged index data to the Page Index CAM 40 and also to the memory request logic 80. The memory request logic 80 also receives inputs from the physical address RAM 50 and from the extract logic 5.

The output of the segment ASD CAM 20 puts out a location number to the physical address RAM 50 while the Page Table ASD CAM 30 and the Page Index CAM 40 put out a location number to the ASD RAM 60. It may be noted that each of the CAMs 20, 30, and 40 are connected to feed an output of "hit" flags to the control logic 100.

The physical address RAM 50 provides an output to the Memory Request Logic 80 while the logical address ASD RAM 60 provides its output to the Insert Logic 90 which provides the final updated pointer.

The output of the Memory Request Logic 80 is shown to involve a memory command and a memory address which is sent to the main memory $100_m$ as indicated in FIG. 3.1. In FIG. 3.1 the ASDAM system 8 is shown located within the processor 4. The main memory $100_m$ has a ASD (Actual Segment Descriptor) Table $100_t$ and also indicates an actual segment of data in main memory and a Page Table.

In the drawing of FIG. 3.2 the memory structures of the ASDAM are shown wherein the Segment ASD CAM 20 carries the Page Table ASD number; the Page Table ASD CAM 30 also carries the Page Table ASD, and the Page Index CAM 40 carries the Page Index data. Likewise in FIG. 3.2 the physical address RAM 50 carries the Page Table address data while the ASD RAM 60 carries the page Actual Segment Descriptor number. In FIG. 1 the Control Logic block 100 monitors and directs all pointer updates required by the executing code and it can interrupt processor execution to perform its own operations and to fetch and load data from memory $100_m$ into the ASDAM memory structures.

Additionally, the ASDAM system has several functional blocks which, between them, combine the input data with the data provided by the RAMs to perform the pointer update operation. These functional blocks include the Extract Logic 5, the Scaling Logic 10, the Memory Request Logic 80, and the Insert Logic 90. These perform their functions on every machine cycle whether they are required or not. The Control Logic 100 determines which results are required for the particular situation and selects them accordingly.

The Segment ASD CAM 20 is associated with the interconnecting physical address RAM 50 in that the location of a "hit" found in this CAM is used as an address to read from the RAM 50. The CAM 20 has a "valid bit" associated with each location to indicate that the address RAM 50 contains the correct data at the corresponding location. The Segment CAM 20 is 23 bits wide, which is the width of an Actual Segment Descriptor (ASD) number, and the Address RAM is 32 bits wide which is the width of a physical address to main memory $100_m$.

Both the CAM 20 and the RAM 50 are 16 locations deep. When the valid bit for a particular location is set, the CAM contains the Actual Segment Descriptor (ASD) number of the Page Table and the RAM contains the absolute address in memory $100_m$ of the base of that Page Table.

The Page Table ASD CAM 30 and the Page Index CAM 40 of FIG. 1, are associated with the ASD RAM 60 in that a "hit" found at the same location in both of these CAMs 30 and 40, gives the Location Number (LN) used as a read address of the RAM 60. These 2 CAMs 30 and 40, share a single valid bit for each location, indicating that the same locations in each CAM are always valid. A location in the ASD RAM 60 contains the ASD number of a single page of a Virtual Segment. If the valid bit of a location in the Page CAMs 30 and 40 is set, then there is valid data in the corresponding location of the ASD RAM 60.

The width of the Page Table CAM 30 and the ASD RAM 60 is 23 bits and the width of the Page Index CAM 40 is 12 bits, this being the maximum size of a Page Index. Each of these CAMs 30 and 40 is 8 locations deep. The Segment ASD CAM 20 and the Address RAM 50 are deeper then the other memory structures because they are also used as a conventional "Translation Lookaside Buffer" and have a greater requirement to store in-use data.

Each of the 5 memory structures of FIG. 1 and FIG. 3.2 of the ASDAM system is a custom designed cell manufactured in CMOS technology. The operation is based on a two phase clock cycle. The CAM search is asynchronous, that is, when a searchkey is presented to the CAM, the output "hit flag" and the Location Number (LN) outputs reflect the current contents after some fixed propagation time.

The RAM read operation is asynchronous to the clock, thus the reading of the RAMs begins as soon as the location number (LN) is available from the CAM and does not have to wait for any clock edge. The write operation is synchronized to the clock and is performed in the second phase of the cycle.

In FIG. 1, the Extract Logic 5 is used to decompose the original 52 bit pointer into its component fields, as shown in FIGS. 2.3 and 2.4, which indicate the various fields of the character pointer and the word pointer. The ASD number is split into two fields within the pointer and the logic isolates the two parts and assembles them into a 23-bit ASD number.

The Size Field, the Paged Bit (P), and the Index Bit (I) are also individually broken out from the pointer and distributed. The 20-bit Index Field from an indexed word pointer (FIG. 2.4) is a Word Index (WI). The same 20-bit field from an indexed Character Pointer contains both a Word Index, in the 16 least significant bits, and a Character Index, in the 4 significant bits.

The Scaling Logic 10 works by first checking the size of the pointer and then scaling the Index Value. The Logic 10 multiplies the Index Value by 2 if the data is in "double precision" words and divides by 6 or 12 if the data is in "characters". Special-purpose shift and divide-by-three hardware is included. If the Control Logic 100 detects character data, the processor 4 is held for 1 machine cycle while the divide operation is completed. The output from the Scaling Logic 10 is a scaled Index Value consisting of a Page Index, a Word Index, and a Character Index.

For an unpaged segment, the Word Index is the number of whole 48-bit words represented by the Index Value, and the Page Index has no meaning. For a "paged" segment, the number of whole words is divided into a number of whole pages plus a number of remaining words. This yields the Page Index and the Word Index. If the pointer does not indicate character data, then the Character Index is set to 0. Otherwise, it indicates the number of remaining characters after the Index Value has been grouped into words.

The Scaled Index Field is the number of characters, words, and pages by which the pointer is to be updated. This is the element within the data segment that will be referenced. The logic forms a 20-bit Word/Character Index Field according to the Size Field and Paged Bit which may be merged back into the pointer by the Insert Logic 90.

A CAM "hit" is defined as an exact match of the searchkey with the data in one of the CAM locations whose valid bit is set. A match on data whose valid bit is "not set" is of no value and is not reported. If there are misses in the ASDAM, then data may have to be fetched from the main memory $100_m$ using an address generated by the Memory Request Logic 80. Depending on the data required, this address may be of the ASD1 word of a given ASD number or of a Page ASD number in some location in the Page Table.

In the Page Table (FIG. 2.1) the physical addresses represent addresses in main memory where a Page Table resides. The ASD Numbers are the ASD Numbers of the pages in this paged segment. The page indices are the page numbers of the pages in this paged segment.

The address of an ASD1 word is found by shifting the data left by two bits, that is, multiplying by 4. It will be seen from the structure of the ASD Table (FIG. 2.2a) in memory, that this procedure translates any ASD number into the address in main memory 100 of its corresponding ASD1 word. The address of the location in main memory containing the Page ASD number of a given page is found by the addition of the Page Table base address and the Page Index of that page.

Whether a memory request is generated and which address is used is governed by the Control Logic 100. Both addresses are generated in parallel in every machine cycle so that if a memory request is required, the address and the fetch command may be issued without delay. The memory command requesting the fetch of a word of data and the physical address in memory of the data to be returned, are sent from the Memory Request Logic 80 to the main memory 100.

The Control Logic 100 contains two counters, one for the Segment ASD CAM 20 and address RAM 50 and one for the other three memory structures. These are used to supply write addresses to the CAM's and the RAM's. Whenever a write operation to the ASDAM is complete, the relevant counter is incremented. The counter supplying addresses to the 16 location structures counts from 0 to 15 and then returns to 0 and begins again. The other counter, supplying addresses to the eight location structures (CAM's 30 and 40 and RAM 60) cycles from 0 to 7.

The depth of the memory structures has been chosen as an optimal compromise between performance, access speed and physical size. The larger the memories, the greater the probability of a hit on a given search. However, larger structures also take up critical area on the VLSI die and have slower access times. During normal processor operation, the slots are quickly filled, and thereafter, when a new slot is required, a slot which already contains valid data must be overwritten. This is done by the address counters described above in a cyclic "round-robin" manner by which each slot is overwritten in turn. This simple replacement scheme has been shown by modelling to be as efficient for this application as any more-sophisticated algorithm would be.

It will be noticed that the CAMs and the RAMs of the ASDAM system exist to provide the ASD number of the Destination Page without the need for accessing main memory. The ASDAM system provides the ASD number of the Actual Segment which the updated pointer must reference and provides an updated Index Field consisting of the Word Index of the word within the actual segment at which it points, relative to the base; and, if character data is involved, the Character Index of the character within this word which is being specified is also referenced. These values are merged directly back into the pointer, overwriting the values that were previously there. The update operation is then complete and the result is stored back into a register in the processor 4.

FUNCTIONAL OPERATIONS

Referring again to FIG. 1, it will be seen that the Memory Request Logic 80 includes (i) an input line $5_m$ from Extract Logic 5; (ii) an input line $50_a$ from Address RAM 50; and (iii) an input line $10_s$ from Scaling Logic 10. As a result of these inputs, the Memory Request Logic will provide an address to the Main Memory $100_M$ for access to data in Main Memory. Three situations A, B, or C occur.

(A) If a dual hit occurs in CAMs 30 and 40, the required data will be found in ASD RAM 60 for pointer updating purposes within the Insert Logic 90. Thus, no access cycle into Main Memory is needed and the pointer update executes in a single machine cycle.

(B) If there is no dual-hit in CAMs 30 and 40, but there is a "hit" in Segment ASD CAM 20, then a Main Memory access will occur by locating a physical address from the physical address RAM 50 which is the base address of the Page Table which will be combined with the Page Index Value on line $10_s$ (from Scaling Logic 10) to form the address of a location in the Page Table. This ASD Number of the Page Table and Page Index value will then be placed, by processor 4, into the Page Table ASD CAM 30 and Page Index CAM 40 respectively; and the data read from the Page Table as a result of this access will be placed in ASD RAM 60 so that, on the next machine cycle, a dual-hit will occur in CAMs 30 and 40 and the RAM 60 will be able to update the pointer in the Insert Logic 90 within one machine cycle.

(C) If there are no hits in either CAMs 20, 30, and 40, then line $5_m$ operates to carry the Page Table ASD Number to Memory Request Logic 80 which requests the physical address of the base of the Page Table, after which processor 4 places this ASD Number into CAM 20 and the physical address into Address RAM 50. Then, on the next search cycle, there will be a "hit" in the Segment ASD CAM 20 and the situation of (B) above will now occur so that the processor 4 will have placed the needed ASD Number in ASD RAM 60, after which, on the next search cycle, the Page Table CAM 30 and Page Index CAM 40 will get a dual-hit as in situation (A) which will take the ASD Number from RAM 60 over into the Insert Logic 90 for pointer updating in one machine cycle.

Line 10i from the Scaling Logic 10 provides a Word Index (WI) value and a Character Index Value (CI) to the Insert Logic 90 to enable complete updating of the pointer.

When a pointer update is detected by the processor 4, the pointer and the Index Value are presented to the ASDAM from registers in the processor 4. The pointer is presented to the Extract Logic 5 which breaks the pointer into its component parts and sends the Page and Index bits (FIGS. 2.3 and 2.4) to the Control Logic 100 and the Size Field and the Paged Bit to the Scaling Logic 10 while the ASD number is conveyed to the CAM's 20 and 30.

The Index Value is conveyed to the Scaling Logic 10. By using the element size supplied by the Extract Logic 5, the Index Value is scaled from a number of data elements into a number of pages, words and characters. In the event of a character pointer, the scaling operation by itself takes one complete machine cycle. In order to allow the more common word pointers to proceed at maximum speed, this operation is microcoded to take a single machine cycle, and when a character pointer is detected by the Control Logic 100, the processing is held for one machine cycle to allow the scaling operation to complete. The Scaled Word Index (WI) and Character Index (CI) are passed on line $10_i$ to the Insert Logic 90. The Scaled Page Index is passed on to the Page Index CAM 40 and also to the Memory Request Logic 80 on line $10_s$.

If the segment is "unpaged", this is not a valid Page Index which is used to search the Page Index CAM 40. However, since the Control Logic 100 ignores all hit flags when indexing unpaged pointers, there is thus no problem in finding false matches.

The original pointer ASD number from the Extract Logic 5 is used to search the ASD CAMs 20 and 30 while the Scaled Page Index is used to search the Page Index CAM 40. The hit flags from all three of these CAMs are conveyed to the Control Logic 100. These same searches are performed whatever type of pointer update is required, with the results being interpreted appropriately by the Control Logic 100.

The Control Logic 100 operates first of all to determine whether the microcode is attempting to perform a pointer update. An input is received from the microinstruction currently being executed, as to whether this is the case. If no pointer update is required in the current machine cycle, the ASDAM system as described here would not be required and would perform no function. However, if an update is required, then it is the Control Logic 100 which controls the flow of data through the ASDAM system and fetches and loads into the ASDAM any missing data.

The Control Logic 100 receives the three CAMs hit flags plus the Paged Bit of the original pointer. It also receives the Size Field which is used to generate a one-cycle hold of the processor in the event of character data. During this one cycle, the processor performs no function, but waits, without changing the contents of its registers, until the outputs from the Scaling Logic 10 have settled. Once the scaling operation is complete, the Control Logic 100 determines whether the ASD number in the pointer must be updated, and, if so, whether the new ASD number is present in the ASDAM 8.

If the original pointer is unpaged, then no change of the ASD number is required and the Index operation completes by merging the scaled Index Value from the output of the Scaling Logic 10 into the pointer. The Index Bit is also set at this time. This is done by the Insert Logic (90). The finished pointer is then written away into a processor register and the machine continues execution with the next operation.

For an index operation on a "paged" pointer, the ASD number in the pointer (that is, that of the Page Table) must be replaced with the ASD number of the destination page. From the original pointer and the scaled Paged Index, the ASD number of the Page Table and the destination Paged Index are available, and between them they uniquely identify the destination page. If there is a "hit" in the Page Table ASD CAM 30, this indicates that the Page Table ASD Number extracted from the original pointer is present in a valid location of this CAM. In fact, if several pages of the same segment have been already accessed, there may be several valid locations in the CAM (each with this same Page Table ASD number), but each with a different Page Index in the corresponding location of the Page Index CAM 40.

When the Scaled Page Index is used to search the Page Index CAM 40 in conjunction with the search of the Page Table ASD CAM 30, a valid hit on the same location in both CAMs indicates that the ASD number of the page corresponding with the Page Index and Page Table ASD number is present in the ASD RAM 60 at the location given by the location number (LN) of the hit. If two hits are found, both in the same location, then all the information needed to complete the index is present in the ASDAM, and the control logic 100 allows the one-cycle pointer update to proceed. The location number of the CAM hit is presented to the ASD RAM 60, which, in turn, supplies the ASD number of the destination page.

The scaling logic 10 supplies the scaled Index Field. Both of these are merged into the original pointer by the Insert Logic (90) overwriting the previous contents of these fields, and the completed pointer is stored away in a register in the processor 4.

At the same time as the search is being performed on the Page CAMs 30 and 40, FIG. 1, the same ASD number is being used to search the Segment ASD CAM 20. If there is a "hit" here, the indication is that the address of the base of the segment corresponding to this ASD number is present in the Address RAM 50. Since this is a Page Table ASD number, the Actual Segment which it identifies is a Page Table, such as is shown in FIG. 2.1.

From the structure of the Page Tables, it is known that the ASD number of each page of the Virtual Segment resides at an offset from the base which is equal to its Page Index. If there is a "hit" in this CAM 20, then the Location Number (LN) of the hit is presented to the Address RAM 50 which in turn provides this to the Memory Request Logic 80 as the base address of the Page Table. Then, by adding on to this the destination Page Index available from the Scaling Logic Module 10, the Memory Request Logic 80 forms the address of the location in main memory which contains the ASD number of the destination page. Thus in FIG. 1, the Page Table $100_t$ shows the area of main memory which contains the ASD number of the destination page.

Thus, assuming there was a hit in the Segment ASD CAM 20, of FIG. 1, the ASDAM 8 is simultaneously searching its CAMs for data while generating the address in main memory of that same data. Moreover, the Memory Request Logic 80 simultaneously translates the ASD number being used to search the ASD CAMs into the address in main memory of the location containing the base address of the corresponding Actual Segment. Again, while searching a CAM, the ASDAM 8 is preparing for a miss by forming the address in main memory of the data it is searching for.

The "hit" information from all three CAMs 20, 30, 40, is sent to the control logic 100 which takes the necessary action. If there is not a hit in both the Page CAMs 30 and 40 but there is a "hit" in the Segment ASD CAM 20, then a memory read request is initiated for the missing ASD number with the address given by the addition of the Page Table base address, supplied by the Address RAM 50, and the destination Page Index. If there is not a hit in the Segment ASD CAM 20, then a read request is issued with the address of the ASD 1 word of the ASD number, as per FIG. 2.2a of the ASD Table.

When the Control Logic 100 detects that a required data item is missing, it must halt the execution of instructions in the processor 4 while the data is fetched and the CAMs and the RAMs are updated. The processor 4 has a mechanism used for interrupting the execution of an operator and invoking a specific microcode routine, after which the original operator is re-started. The mechanism is initiated by certain hardware-detected conditions and the microcode routine invoked is dependent upon the particular situation. The ASDAM 8 uses this mechanism to interrupt the flow of microcode and fill the ASDAM system with the required data, and then restart the operator at the place where the missing data was detected.

This is achieved by putting the current micro-instruction address on the processor subroutine stack and loading a new micro-instruction address into the processor sequencing control. The microcode continues to execute from this new location until it completes its function, when the original micro-instruction address is retrieved from the subroutine stack and execution continues from that point. Two short microcode routines may be invoked by the control logic 100. A "Segment Fill" routine is used to load the Segment ASD CAM 20 and the Address RAM 50; and a "Page Fill" routine is used to load the remaining two CAMs, 30, 40 and the ASD RAM 60. Both routines require two machine cycles plus a single memory read.

If the index of a "Paged" pointer is in progress and a hit is not found in the Page CAMs 30 and 40, but there is a hit in the Segment ASD CAM 20, then the Control Logic 100 initiates a memory read using the address of the destination page ASD number and invokes the Page Fill routine. When the load is complete, the operator is restarted and the required hit is found. The pointer update is completed.

If a hit is not found in the Page CAMs 30 and 40 or in the Segment ASD CAM 20, then the Control Logic 100 initiates a memory read using the address of the ASD 1 word and the "Segment Fill" routine is invoked. When the Segment Fill routine is complete, and the operator is re-started, inevitably, this time there is a hit in the Segment ASD CAM 20 and "no-hit" in the Page CAMs 30 and 40. At this time a memory request for the destination Page ASD number is initiated and the Page Fill routine is invoked. Calling these two routines in serial is slightly less efficient then in invoking a routine which performs both loads simultaneously, but the case requiring this is rare and it is found that dealing with it in this way is consistent and allows simplification of the hardware, the microcode, and the Control Logic.

The Segment Fill routine writes the missing ASD number into a location in the Segment ASD CAM 20 given by the current value of the 16-location address counter in the control logic 100. The processor then waits until the memory returns the requested base address data which is then written into the physical address RAM 50, at the location given by the unchanged 16-location address counter. At the same time, the valid bit for this location in the CAM is set and the 16 location address counter is incremented, so that the next time a load is done the adjacent location is written. The update is now complete and the next time a search is performed on the same ASD number, a hit will be returned.

The Page Fill routine writes the ASD number and the Page Index used for the searches simultaneously into a location of the Page Table ASD CAM 30 and the Page Index CAM 40 respectively. This location is given by the 8-location address counter in the Control Logic 100. When the requested data word returns from memory it is written into the ASD RAM 60. The location is again given by the 8-location address counter. As the data is loaded into the RAM, the valid bit of the corresponding location in the CAMs 30 and 40 is set and the 8-location address counter in the control logic 100 is incremented.

If the required data is present in the ASDAM 8, the indexing of any word pointer may be achieved as described above in a single machine cycle. If the data is in characters, then two machine cycles are required. Each load routine required usually adds 5 machine cycles to the operation.

Once the destination Page ASD number is available, it is taken along with the Scaled Index Field and merged back into the pointer, over writing the existing ASD number and the Index Field, to form an updated pointer. This is done by the Insert Logic (90). This is written back into a processor register, and the operation is complete. The data written into the ASDAM memories during the course of an index operation may be used in subsequent updates of pointers to the same page or different pages of the same segment.

Locations remain valid until the location counters wrap around and overwrite them in turn with other data. No data is ever written into the ASDAM 8 unless it has been searched for, immediately prior. This guarantees that the same data is never found in two different locations of the same CAM.

There are certain times during processor operation when the ASD Table (FIG. 2.2a) in memory is modified by the Operating System. As with any cache system, it must be guaranteed that the data in the cache accurately reflects the actual data stored in main memory 100. Coherency must be maintained and since the ASD Table is changed very infrequently, this is simply achieved by purging the ASDAM 8, whenever it takes place, that is to say, whenever the ASD Table is modified. The control logic 100 receives a flag from the processor 4 indicating that a change is being made to the ASD Table $100_t$ (of FIG. 2.2a). The control logic 100 then resets all of the CAM valid bits to "0" simultaneously. The next searches for any given ASD number or Page Index will therefore always result in "misses" and the correct data will be fetched from the updated ASD Table.

OPERATIONS

Certain specific examples of the use of the ASDAM system will be forthcoming to illustrate the functional operation.

THE UNINDEXED POINTER, DESCRIBING AREA OF UNPAGED MEMORY CONTAINING SINGLE PRECISION WORDS

FIG. 4.1.1 shows an example of a pointer where the paged bit is 0, the index bit is 0, the size field designates "word", the word index is not used, and the ASD Number is equal to 5. The paged and indexed bits are both off (equal to "0") indicating that the data is unpaged and the pointer is currently unindexed. The size field indicates that the region of main memory contains word data. The Word Index (WI) field has no meaning in this case because the pointer is unindexed. The ASD Number (equal to 5) indicates where in the ASD Table may be found the ASD 1, ASD 2, and ASD 3 words describing this area of memory.

The ASD 1 word is found at address (ASD Number×4) equal to 20 in the main memory. This contains the base address of the Actual Segment in memory. The ASD 2 word, at the address (ASD Number×4+1) equal to 21 contains the "length" of the segment. The segment therefore, begins at address 2000 (main memory) and is of a length of 100 words. The ASD 3 word has no significance for an unpaged segment.

AN INDEXED POINTER, DESCRIBING AN AREA OF UNPAGED MEMORY CONTAINING DOUBLE PRECISION WORDS

Referring to FIG. 4.1.2, the pointer has the Paged Bit "off" indicating that the memory segment is unpaged. The Index Bit (I) is set equal to "1", indicating that the pointer is indexed, and the size field shows that the data in the segment is "double precision word" data. The ASD Number (equal 10) identifies, via the ASD Table, that the segment begins at the physical address 4000 and is of a length of 200 words. The Word Index (WI) shows that the pointer is referencing the 24th word from the base address, that is the word which resides at the physical address 4024, as seen in FIG. 4.1.2.

AN UNINDEXED POINTER, DESCRIBING AN AREA OF PAGED MEMORY CONTAINING 4-BIT CHARACTER DATA

FIG. 4.1.3 shows a pointer with the paged bit set equal to "1" and the indexed bit equal to "0" while the size is that of a 4-bit character. Here the paged and indexed bits indicate that the pointer references a paged region of main memory. The ASD Number contained (Equal 15) is that of the Virtual Segment's Page Table, which begins at address 5000. The Virtual Segment has a length of 20 words (word number "0" to "19") indicating that the Virtual Segment is composed of 20 pages, each of the fixed page length (4096 words per page). The data in those pages is in the form of 4-bit characters packed together at 12 characters per word. Here the Word and Character Index (WI and CI) have no significance since the pointer is unindexed.

AN INDEXED POINTER, DESCRIBING AN AREA OF PAGED MEMORY CONTAINING 8-BIT CHARACTER DATA

FIG. 4.1.4 shows a pointer wherein the Paged Bit and Indexed Bit indicate that the pointer is paged and indexed. The size field indicates 8-bit data. The Word Index (WI) indicates the 4090th word. The Character Index (CI) indicates the 5th character in the word. The ASD Number field (equal to 25) contains the ASD Number of one page of the Virtual Segment: that is, the page within which the referenced character resides.

The ASD Table in FIG. 4.1.4, indicates that the Actual Segment (corresponding to this ASD Number) begins at the absolute address 10,000. The pointer, therefore, indicates the 5th character of the 4090th word of this particular page of the segment. The word actually resides at the physical address 14090, as seen in FIG. 4.1.4. It may be noted that the pointer does not identify either the Page Table of the Virtual Segment or the Page Index of the current page.

SCALING AN INDEX VALUE FOR AN UNPAGED WORD POINTER

As seen in FIG. 4.2.1, there is indicated a single precision "word" pointer and an associated Index Value of 10,000. With single precision word pointers, the scaled Character Index is set to "0" and the Index Value gives the number of words directly, in this example 10,000. Since the segment is unpaged (p0), the Word Index (WI)is 10,000. It may be noted that whether the pointer is indexed, or not indexed, this has no bearing on the scaling function.

SCALING AN INDEX VALUE FOR A PAGED WORD POINTER

FIG. 4.2.2 shows a pointer indicating an Index Value (10,000) and a double precision word pointer. With double precision word pointers, the scaled Character Index (CI) is set to "0" and the Index Value is multiplied by 2 in order to give the number of 48-bit words occupied by this number of double precision (96-bit) words, that is to say 20,000. This is divided by the page length (4096 words) in order to give 4 whole pages (16,384 words) plus 3,616 words left over. Thus the Page Index is therefore 4 and the Word Index is 3,616.

SCALING AN INDEX VALUE FOR A PAGED CHARACTER POINTER

FIG. 4.2.3 shows a 4-bit Character Pointer and the Index Value of 10,000. This shows that the data is in 4-bit characters and that the data segment is paged. The Index Value (equal 10,000) is therefore the number of 4-bit characters by which the pointer is to be updated. In order to scale the Index Value, it is necessary to separate it into the number of pages, words, and remaining characters that it represents. Since there are 12 4-bit characters per each 48-bit word, 10,000 is divided by 12 to give 833 words with 4 characters left over. As to the number of pages, or Page Index, this has a value of "0" since 833 is less then the normal page length of 4,096 words. Thus the Word Index is therefore 833 and the Character Index is equal to 4.

SCALING AN INDEX VALUE FOR AN UNPAGED CHARACTER POINTER

FIG. 4.2.4 shows an 8-bit character pointer with its associated Index Value of 10,000. This shows that the data is in 8-bit characters and that the data segment is unpaged (P=0). The Index Value is therefore the number of 8-bit characters by which the pointer is to be updated. To scale the Index Value, it is necessary to separate it into the number of whole words, and remaining characters, that it represents. Since each 48-bit word has six 8-bit characters in it, then dividing 10,000 by 6 gives 1,666 whole words, with 4 characters left over. The Word Index (WI) is therefore 1,666 and the Character Index (CI) is therefore 4.

INDEXING OF AN UNPAGED POINTER

FIG. 4.3.1 shows an unpaged pointer which is to be indexed by an Index Value of 50. The pointer indicates "word" data and the Index Value scales into a Word Index of a value of 50. The ASD Number (5) in the pointer is that of the Actual Segment in main memory and does not change. The Word Index (WI) is set to 50 and the Index Bit (I) is set equal to "1". The "updated pointer" now indicates the 50th word of the segment The ASD Number of 5 is multiplied by 4 to give a physical address of 20 in the ASD Table which contains the physical address 2000 in main memory. This represents word zero of the data segment and then by indexing up 50 words, the 50th word is located at the absolute address of 2,050. (FIG. 4.3.1).

INDEXING OF A PAGED POINTER

First referring to FIG. 4.1.3 and then consider indexing this 4-bit character pointer by an Index Value of 50, as will be seen in FIG. 4.3.2. This "scales" into a Paged Index of "0" (page 0), a Word Index of 4 and a Character Index of 2. (FIG. 4.3.2). Since 12 characters (of 4-bits each) is one word, then characters subsequent would involve 4 words plus 2 characters.

The Indexed Pointer must therefore reference the 2nd character of the 4th word on page zero of the Virtual Segment. The pointer originally contained the ASD Number 15 (FIG. 4.1.3) whereas now the Indexed Pointer must contain the ASD Number of page zero which is ASD No. 20 in FIG. 4.3.2. Location "0" of the Page Table contains the ASD Number of page zero which is equal to 20 (FIG. 2.1, bottom row) and this is accessed by "translating" the Page Table ASD Number into the absolute address 60 of its ASD 1 word, containing the base physical address of the Page Table 5,000 and reading this location from the ASD Table to the Page Table (FIG. 4.3.2 and also FIG. 4.2.1) to provide "20" as the ASD Number for the pointer in FIG. 4.3.2.

When this location is returned to the processor, the relevant Page Index, in this case equal to "0" is added onto it to form the physical address 5000 of the location in main memory containing the ASD Number of page zero which ASD No. is 20. The ASD Number (equal to 20) is then read from this address and inserted into the pointer. At the same time, the Word Index (WI) and the Character Index (CI) are inserted and the Index Bit (I) is set equal to "1". Thus the updated Index Pointer is shown in FIG. 4.3.2 at the top of the figure which then permits the ASD No. 20 to find Word 0 in Page and to "index up" 4 words and 2 characters to get the specified character required by the processor 4.

INDEXING OF PAGED POINTERS WITH THE ASDAM SYSTEM

Referring to FIG. 3.3, there is seen the Segment ASD CAM 20 under which resides the physical address RAM 50. Then associated with the CAM 20 is the Page Table ASD CAM 30 and the Page Index CAM 40 underneath of which resides the ASD RAM 60.

The column between the CAM 30 and the CAM 40 is the location valid bit values to indicate whether the data is valid or invalid. A "1" indicates the validity of the data.

In the Segment ASD CAM 20 there are two "valid" locations containing the Page Table ASD Numbers 50 and 35. The corresponding locations in the Address RAM 50 indicate that the "base address" of these Page Table Numbers are at the physical address 1,000 and 2,000 respectively.

The location 0 in the Page Table ASD CAM 30 and the Page Index CAM 40 indicate that page 4 of the segment whose Page Table has ASD Number 15 has the ASD Number of 40 (location 0 of the ASD RAM 60).

Similarly, location 1 of CAM 30 shows that page 1 of the same segment has an ASD Number of 60 (location 1 of ASD RAM 60). Location 2 of the CAMs 30 and 40 indicate that page 7 of the Virtual Segment having ASD Number 35 has the ASD Number 38.

FIG. 3.3 and the just described contents will be taken to be the starting point for a series of examples which follow herein.

Now referring to FIG. 4.1.3 involving the situation of an unindexed pointer used for describing an area of paged memory containing 4-bit character data. The upper portion of FIG. 4.1.3 shows an unindexed pointer and its relationship to the ASD Table (in main memory 100) and its relationship to the Page Table (also in main memory 100). The Page Table is an Actual Segment of main memory containing pointers (ASD Numbers) to the individual pages comprising a "Virtual Segment". It thus contains the same number of words as there are pages in the segment. It is used to locate those pages when they are required to be written to or read from.

An example could be that of indexing the 4-bit character pointer in FIG. 4.1.3 by an Index Value of 50, which would be inserted into the Scaling Logic 10 of FIG. 1. Reference will be made to the previous discussion of FIG. 3.3 (indexing of paged pointers with the ASDAM system) showing examples of the ASDAM contents. The Index Value scales into a Page Index of "0", a Word Index of 4 and a Character Index of 2. It may be noted that since the pointer indicates character data, that the control logic holds the processor for one machine cycle while the scaling takes place.

The Segment CAM 20 and the Page Table ASD CAM 30 (FIG. 3.3) are searched simultaneously for the ASD Number extracted from the original pointer (which is fed into the extract logic 5 of FIG. 1). This is the ASD Number of the Page Table of the Virtual Segment. The Page Index CAM 40 is searched with the Scaled Paged Index (equal to "0") which is the Page Index of the destination page. All three searches, take place simultaneously and independently, and the "hit" flags are supplied to the Control Logic 100.

With the ASDAM contents shown in FIG. 3.3 previously, there is a hit in the Page Table ASD CAM 30 at locations "0" and "1" but no hit in the corresponding locations in the Page Index CAM 40. Additionally, there is "no hit" in the segment ASD CAM 20. The Control Logic 100 checks for the hit on the same location on both the Page CAMs 30 and 40, and in this case it was not found. Next the Control Logic checks for a hit in the Segment ASD CAM 20 and this was not found either. The Control Logic 100 immediately issues a memory read request (to Request Logic 80, FIG. 1), selecting the physical address of the ASD1 word translated from the ASD Number of the Page Table. The translation in this case involves multiplying by 4. FIG. 4.1.3 shows that the ASD Number 15 has its ASD 1 word at address 60 in main memory and that this location contains the absolute address 5,000 which is the base (Word 0) of the Page Table.

While the Read is being completed, the Control Logic 100 invokes the "Segment Fill" routine which stores the missing ASD Number, 15, in the next available location of the Segment ASD CAM 20, given by the 16 location address counter. This is location number 2 in FIG. 3.3 of the Segment ASD CAM 20.

When the data returns from memory, it is stored in the corresponding location, that is location number 2, of the Address RAM 50 of FIG. 3.3. Location Number 2 of the segment CAM 20 is then marked valid (valid bit changed from "0" to "1") and the location counter is incremented to 3 and the pointer update operation is restarted.

At this time, when the ASD Number from the pointer is used to search the Segment CAM 20 (FIG. 3.3) a "hit" is now found in location 2. The contents of the other two CAMs 30 and 40 are unchanged and still there is no hit found in both the CAMs 30 and 40. The Control Logic 100 recognizes the hit in the Segment ASD CAM 20 and the location (LN) of the number of the hit, (that is location 2) which LN is then conveyed to the physical address RAM 50 of FIG. 3.3. The contents of location 2 of this RAM 50 is supplied at its output over to the Memory Request Logic 80. This output is 5,000 which is the base address of the Page Table previously read from the memory location 60 of the ASD Table in FIG. 4.1.3.

The Scaled Page Index, supplied by the scaling logic (10) gives the displacement from the base of the Page Table of the location containing the ASD Number (15) of the destination page. This is the ASD Number which is required to be put into the updated pointer. The physical address of this location in main memory $100_m$ must therefore be determined and its contents read.

The base address of the Page Table, supplied by the address RAM 50 is added to the Scaled Page Index, to form the address of the location of the Page Table which contains the destination page ASD Number. The Control Logic 100 issues a memory read to fetch this word from main memory $100_m$. This time the Page Fill routine is invoked, while the processor waits for the data to be returned from main memory. The ASD Number of the Page Table (which is equal to 15) is written into the next available location of the Page Table ASD CAM 30, which is given by the 8-location address counter. This is location number 3 in FIG. 3.3.

At the same time, the Scaled Page Index (equal to "0") is written into the same location of the Page Index CAM 40. When the word containing the ASD Number of the destination page is returned from memory, the ASD Number (equal to 20) is written into the same location (location 3) of the ASD RAM 60 FIG. 3.3.

Once this data has been written, then location 3 of the page CAMs 30 and 40 are marked valid ("0" becomes "1") and the 8-location address counter is incremented.

The ASDAM contents are now as shown by FIG. 4.4.1.

At this point, the "update" operation is restarted and this time a "hit" is found on ASD Number 15 and the Page Index equal to "0" in location 3 of the Page CAMs 30 and 40. This location number 3, is passed directly as a read address to the ASD RAM 60 which supplies the destination ASD Number equal to 20. This hit information is received by the Control Logic 100 which completes the index operation by merging the ASD Number and the scaled index field into the pointer using the insert logic (90). This is then written away into a processor register and the updated pointer appears as shown in FIG. 4.3.2.

INDEXING OF PAGED POINTERS WITH THE ASDAM SYSTEM

Now referring to FIG. 4.4.1, there is shown an example of the three CAMs and the two RAMs with certain data residing therein. Now suppose it is desired to index the same pointer (character size of 4 bits) as shown in FIG. 4.1.3 by an Index Value of 98,354. This Index Value 98,354 is presented to the Scaling Logic 10 of FIG. 1, which then returns a Page Index of 2, a Word Index of 4, and a Character Index of 2. Since 1 character is 4 bits and 12 characters is equal to one word (48 bits), then 98,354 divided by 12 gives 8196 words plus 2 characters. Since one page is 4096 words, this means there are 2 pages plus 4 words plus 2 characters. Thus the "updated pointer" will reference the 2nd character of the 4th word of the 2nd page of the Virtual Segment by means of the Page Table having ASD Number 15. It may be noted that since the pointer indicates "character data", that the Control Logic 100 holds the processor for one machine cycle while the scaling takes place.

The ASD Number of the Page Table is extracted from the original pointer and used to search the ASD CAMs 20 and 30 FIG. 3.3. The Destination Page Index, "equal to 2", is used to search the Page Index CAM 40. The hit flag supplied to the Control Logic 100 indicates that a hit has not been found on the same location in both the Page ASD CAM 30 and the Page Index CAM 40, but that a hit was found on the Segment ASD CAM. This indicates to the Control Logic 100, that although it does not have the data required to merge into the pointer and to complete the index, it does have available the base address of the Page Table. From this, it can compute the address of the location in memory containing that data.

The location number of the hit (equal to location 2) in the Segment ASD CAM 20 is passed onto the Address RAM 50 as a read address. Then the data read out from this location (equal to 5,000) is added to the Destination Page Index (equal to 2) and a read request is issued for the data at location 5,002 in Main Memory $100_m$.

The Page Fill routine is invoked by the Control Logic 100 which writes location number 4 of the Page Table ASD CAM 30 and the Page Index CAM 40 with the numbers 15 and 2 respectively, FIG. 4.4.2a. When the data returns from main memory, the ASD Number of page 2 (that is 90) is written into location 4 of the ASD RAM 60. The 8-location address counter is incremented and location 4 of the Page CAMs 30 and 40 is marked valid (i.e. the valid bit is changed from "0" to "1").

The indexing operation is then restarted and completed, hits then being found on Page Index 2 and ASD Number 15 both at the same locations of their respective CAMs. The Location Number of the hits (see FIG. 4.4.2a), that is location number 4, is passed down to the ASD RAM 60 which provides the ASD Number of the Destination Page, which is shown as equal to 90. This is then merged into the original pointer with the scaled index field by the Insert Logic (90) and the operation is complete. The final ASDAM contents and the updated pointer are indicated in FIGS. 4.4.2a and 4.4.2b showing the updated ASD No. as 90.

INDEXING PAGED POINTERS WITH THE ASDAM SYSTEM

Assuming the contents of the ASDAM memories to be as shown in FIG. 4.4.2a: now if it is desired to index the same pointer of FIG. 4.1.3 by an Index Value of 49,202, the following occurs. This Index Value of 49,202 is presented to the scaling logic 10 (FIG. 1) which returns a Page Index of 1, a Word Index of 4, and a Character Index of 2. This is accomplished by dividing 49,202 by 12=4100+2 left over (recall there are 12 characters per word). Thus 4100 words=1 page (4096 words)+4 extra words.

Thus the updated pointer will reference the 2nd character of the 4th word of the 1st page of the Virtual Segment with the Page Table having ASD Number 15 (FIG. 4.1.3). It should be noted that since the pointer indicates "character data", that the Control Logic 100 holds the processor one machine cycle while the scaling takes place.

The ASD Number of the Page Table is extracted from the original pointer and used to search the ASD CAMs 20 and 30. As seen in FIG. 2.1, the Page Table uses the Page Index as a linking mechanism between the ASD Number of the pages and the physical address in main memory. The Destination Page Index (equal to 1) is used to search the Page Index CAM 40. The hit flags supplied to the Control Logic 100 indicate that a hit has been found on the same location, that is location 1, in both the Page Index ASD CAM 30 and the Page Index CAM 40, and also that a hit was found in the segment ASD CAM 20. This tells the Control Logic 100 that it does have available, from the ASD RAM 60, the data required to merge into the pointer and complete the index in a single machine cycle. The "hit" in the Segment ASD CAM 20 is irrelevant since no data needs to be fetched from memory.

The location number of the Page CAMs 30 and 40 hit location, FIG. 4.4.2a, that is location 1, is passed down to the ASD RAM 60 which then provides the ASD Number of the Destination Page at location 1 which is seen as the ASD Number of 60. This then is merged into the original pointer with the scaled index field and the operation is complete. No main memory reads are required and the contents of the CAMs and the RAMs remain unchanged. FIG. 4.4.3 (updated pointer) shows the updated pointer after execution of the example discussed with regard to FIG. 4.4.2a and 4.1.3 indicating the updated ASD No. as 60, and Page Index equal to 1, the Word Index equal to 4, and the Character Index equal to 2.

It may be noted that there are two portions of the ASDAM which serve separate functions, the right hand portion consisting of CAMs 30, 40 and RAM 60 operate when hits are present in order to provide information to the processor to generate an updated pointer within one machine cycle. On the other hand the left hand side of the system consisting of the CAM 20 and RAM 50 operate when "no hits" are found in the right hand side so that a rapid operation can occur to fetch the required data from main memory for insertion into CAMs 30, 40 and RAM 60.

Described herein has been a system for pointer updating in paged memory systems where an address translation system is used. A Page Table CAM 30 and a Page Index CAM 40 receive information from the original pointer and an Index Value through scaling logic respectively. These are used to search the 2 CAMs for hits. If a hit is found then the location number of the hit is fed to a ASD RAM 60 which then provides the ASD Number of a destination page which enables the Insert Logic 90 to update the pointer which can then be used by the processor, 4.

Another portion of this system consists of the Segment CAM 20 and the address RAM 50 which operates to fetch the necessary data from main memory when no hits occur in the Page Table CAM 30 and Page Index CAM 40. Thus with this anticipatory action of the CAM 20 and RAM 50 (called a translation lookaside buffer, TLB) the access for physical address from main memory is speeded up when there have been no hits in the Page Table CAM and Page Index CAM (30 and 40).

The Segment ASD CAM 20 carries logical addresses known as ASD or Actual Segment Descriptor Numbers which then can be used with the address RAM 50 to provide a physical address for the main memory thus providing address translation operations without memory accesses.

While the architecture and circuitry of the described preferred embodiment function to save the operational cycles as indicated, the ASDAM System may be effectuated with other configurations and should be understood to be encompassed by the following claims.

What is claimed is:

1. In a computer system including a main memory means and a processor utilizing pointers having an Actual Segment Descriptor (ASD) Number logical address for accessing a next-required ASD Number logical address from said main memory means, a pointer logical address updating system for developing an updated pointer holding the ASD Number logical address, of newly targeted data, said system comprising:
   (a) said processor holding an original pointer and receiving instructions for accessing specified new data from any portion of memory, said specified new data to be subsequently identified by the updated pointer using an ASD Number logical address to locate a paged or unpaged segment and a displacement value to locate a word or character therein;
   (b) said main memory means for storing words of data in multiple word segments where each paged segment is organized in numbered pages with each page having a fixed number of words and multiple word segments of more or less words than a paged segment, said memory means including:
     (b1) an Actual Segment Descriptor (ASD) Table for linking the ASD Number logical address of the base location of the first data word in a particular segment with a physical address in said main memory means;
     (b2) a Page Table providing the ASD Number logical address for each page number in each paged segment;
   (c) means for accessing selected segments, pages, and words or characters from said main memory means via said pointers using said ASD Number logical address;
   (d) means for modifying the (ASD Number) logical address in said original pointer to enable subsequent access to said next required ASD Number logical address; said means for modifying including:
     (d1) means for accessing in one clock cycle, the ASD Number logical address and displacement value of said newly targeted data for insertion into said original pointer in place of the original ASD number and displacement value.

2. The system of claim 1 wherein said means for accessing selected segments, pages and words or characters includes:
   (b1) a segment content addressable memory (CAM) cache means for holding (ASD Number) logical addresses of frequently used data segments which can be searched for matching logical addresses in said original pointer;
   (b2) an associated physical address RAM memory holding physical addresses of main memory data correlated to the logical addresses residing in said segment CAM cache means, and connected to receive location number selection information from said segment CAM cache means when a match is effectuated therein.

3. The system of claim 1 wherein said means for modifying said logical address data includes:
   (c1) a dual CAM cache memory means for storing ASD Number logical addresses of frequently used paged data segments from main memory, and storing page index values which designate said page number of a paged data segment;

(c2) means to search said dual CAM cache memory means to find a common logical address and common displacement value as supplied by said processor;

(c3) means, if a dual hit occurs in the search of said dual CAM cache memory means, to select, in one clock period, an output ASD Number logical address from an associated logical address RAM memory holding the ASD Number logical address of said base location of the paged data segment in said main memory means;

(c4) means to insert said output logical address from said associated logical address RAM memory into the original pointer to replace the original ASD Number logical address.

4. The system of claim 3 wherein said means to search includes:

(c2a) first logic means to extract the ASD Number logical address from the original pointer for transmission to said dual CAM cache memory means to search for a match;

(c2b) second logic means for supplying a displacement value provided to said dual CAM cache memory means from a scaled index value supplied by said processor to search for a match;

(c2c) said scaled index value generating a displacement value which is reflective of data organized into single precision words, double precision words or characters.

5. The system of claim 3 which further includes:

(d) means to select the ASD Number logical address of a main memory segment of data, if no dual hit occurred in said dual CAM cache memory means;

(e) means to translate said ASD Number logical address into a physical address for accessing said main memory segment of data words to supply the missing ASD Number logical address in said dual CAM cache memory means.

6. In a computer system having an instruction processor and main memory containing segments having multiple data words which segments are organized into pages holding a fixed number of data words and segments holding more or less than a fixed page of words and also containing an Actual Segment Descriptor (ASD) table, providing physical addresses of said segments, and a Page Table giving ASD Number logical addresses of each page within each of said segments, the combination including:

(a) processing means utilizing pointers for locating segments of said main memory and for locating pages within said segments of said main memory, locating words or characters within said located pages said pointers including:

(a1) an original pointer holding an ASD Number logical address plus a size field for initiating an update operation and indicating subsequent targeted data to be processed;

(a2) a modified pointer subsequently for use after said original pointer has been operated on to provide a new ASD Number logical address which locates subsequent targeted data to be processed;

(b) said main memory having segments addressable by physical addresses which can be correlated to ASD Number logical addresses, said ASD Number logical addresses residing in said Actual Segments Descriptor (ASD) table and said Page Table;

(c) first content addressable memory (CAM) dual cache means for storing ASD Number logical addresses of said main memory's Page Tables and also storing Page Index values usable for locating an individual page, said first content addressable memory dual cache means for receiving an ASD Number logical address and Page Index value to be searched for a dual match, said first content addressable memory dual cache means including:

(c1) means to output a location number to an associated logical address ASD Random Access Memory (RAM) if a dual match has occurred in said first CAM dual cache means;

(d) said logical address ASD RAM for receiving said location number from said first content addressable memory (CAM) dual cache means and for outputting the ASD Number logical address of a targeted destination page to be accessed, said ASD Number logical address of said destination page being transmitted to an associated insert logic unit;

(e) said insert logic unit for receiving said original pointer and for receiving the destination logical address (ASD Number) and scaled character and word index values in order to update said original pointer's ASD Number logical address and character and word index values to reference the targeted data;

(f) control logic means for enabling said content addressable memory (CAM) dual cache means and said associated ASD logical address RAM and said insert logic unit to effectuate modifying of said original pointer.

7. The system of claim 6 which further includes:

(g) a second content addressable memory (CAM) cache memory means for storing ASD Number logical addresses of data segments in main memory which constitute logical addresses which can be correlated to physical addresses in said main memory, said second content addressable cache memory means connected to receive the ASD Number logical address of said original pointer;

(f) associated physical address RAM means connected to receive the output of said second content addressable cache memory means, as a location number when a match has occurred, in said second CAM cache memory means, said location number acting to translate the ASD Number logical address to the physical address in main memory for locating the ASD Number logical address of the first location of the segment targeted, said control logic means operating to access said physical address only when there is no hit effectuated in said first content addressable memory dual cache means.

8. The system of claim 7 which includes:

(h) memory request logic means for receiving the physical address of a Page Table from said physical address RAM means and for receiving a Scaled Page Index Value in order to access, from said main memory, the new logical address of said subsequently targeted data for loading into said ASD logical address RAM.

9. The system of claim 7 which includes:

(1) memory request logic means for receiving the ASD Number logical address of a Page Table from said original pointer in order to access, from said main memory, the physical address of the first location (ASD1 word) of said Page Table for insertion into said physical address RAM.

10. In a computer system using pointers holding logical addresses to access data and for receiving instructions to target new data and having a processor with main memory organized into unpaged data segments and paged data segments having pages of a fixed number of data words where each data word is "n" bits in length, said main memory also holding a segment logical address table (ASD Table) and logical address page table (Page Table), a method of accessing memory data through updating of said pointers comprising the steps of:

(a) selecting an ASD Number logical address from an original pointer to search a Page Table ASD Number logical address cache memory and to search for a matching page table ASD Number logical address;

(b) providing a page index value to search a Page Index cache memory to find a matching page index value;

(c) reading out a data location in an associated logical address ASD RAM, when matches (hits) occur simultaneously in said Page Table ASD Number logical address and said Page Index cache memories, to provide an output logical address to an insert logic unit;

(d) modifying said original pointer to remove the original ASD Number logical address residing therein and replacing it with a new ASD Number logical address from said associated logical address ASD RAM.

11. The method of claim 10 which further includes the step (e) providing a word index value to said insert logic unit to insert said word index value into said pointer to enable updating the ASD Number logical address of sad original pointer for location of a targeted word;

12. The method of claim 11 which further includes the step of:

(f) providing a character index value to said insert logic unit to insert a character index value into said modified pointer to enable location of a targeted character in a targeted word.

13. In a computer memory management system using an instruction processor and where main memory is organized into paged segments of words and unpaged segments of words and where each segment and each page is provided with a virtual logical address designated respectively as an Actual Segment Descriptor (ASD) Number logical address and a Page ASD Number logical address, a system for updating an original logical address pointed to enable location of a newly selected memory address location, said system comprising:

(a) said main memory for storing words of data in paged and unpaged segments where each paged segment is organized in pages having a fixed number "N" or words, and each unpaged segment holds less or more than N words, said main memory including:

(a1) an ASD Table to associate each ASD Number logical address with a particular group of words;

(a2) a Page Table providing the ASD Number logical address of each page in each paged segment;

(b) said instruction processor utilizing an original logical address pointer for holding an ASD Number logical address, to designate an unpaged segment of main memory or a paged ASD Number logical address to designate a page in a paged segment of main memory, and including:

(b1) indexing data to adjust the ASD Number logical address of the first word's location to shift for selection of a particular word, or character in a particular word;

(c) programmed instruction data to said instruction processor to specify a search of the ASD Number logical address for targeted new pages and words for subsequent processing by said processor;

(d) means for updating the ASD Number logical address in said original pointer to enable access to the new logical memory address of said targeted new pages and words specified by said programmed instruction data.

14. The system of claim 13 wherein said means for updating said logical address data includes;

(d1) a dual CAM cache memory means for respectively storing logical addresses designated as Page Table ASD Numbers of frequently used pages of paged segments in main memory, and for storing page index values which designate a page, a word or character residing in a designated segment of said main memory;

(d2) means to search said dual CAM cache memory means to match the logical address Page Table ASD Numbers and page index value as supplied by said processor;

(d3) means, if a dual hit occurs in the search of said dual CAM cache memory means, to select an output ASD Number logical address representing the ASD Number of a selected page from an associated ASD logical address RAM memory holding logical address ASD Numbers of the first word location of a paged data segment in said main memory;

(d4) means to insert said output ASD Number logical address from said associated ASD Number logical address RAM memory to replace the ASD Number logical address in said original pointer, to form a modified pointer, including:

(d4a) scaling logic means to insert an index field into said modified pointer.

15. The system of claim 14 which includes means for accessing selected segments, pages and words, said means including:

(c1) a segment content addressable memory (CAM) cache means for storing Page Table ASD Numbers of frequently used word segments which can be searched for matching Page Table ASD Numbers when said dual CAM cache memory means does not provide a dual hit;

(c2) an associated physical address RAM memory holding physical addresses of said Page Table ASD Numbers correlated to the Page Table ASD Numbers residing in said segment CAM cache means, and connected to receive location number selection information from said segment CAM cache means when a match is effectuated therein;

(c3) means to search said dual CAM cache memory means for a match to said logical address pointer's Page Table ASD Number;

(c4) memory request logic means for receiving, from said segment CAM, said physical address of a matched Page Table ASD Number to access the missing Page Table ASD Number for conveyance to said dual CAM cache memory means when no match occurs in the first search of said dual CAM cache memory means.

16. The system of claim 15 which includes:
(a) said processor providing means for transmitting said original pointer holding said ASD Number logical address and a Page Table ASD Number, to said segment CAM and to said dual CAM cache memory means;
(b) control means to sense that no match (hit) occurred in said segment CAM and said dual CAM cache memory means;
(c) said memory request logic means for requesting the missing ASD Number logical address and Page Table ASD Number from main memory via said processor for placement in said segment CAM and said dual CAM cache memory.

* * * * *